United States Patent
Okayama et al.

(10) Patent No.: US 9,883,069 B2
(45) Date of Patent: Jan. 30, 2018

(54) IMAGE READING DEVICE AND PRINTING APPARATUS

(71) Applicant: FUJIFILM Corporation, Tokyo (JP)

(72) Inventors: Yoshiyuki Okayama, Kanagawa (JP); Takahiro Inoue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/445,370

(22) Filed: Feb. 28, 2017

(65) Prior Publication Data
US 2017/0171420 A1 Jun. 15, 2017

Related U.S. Application Data

(63) Continuation of application No. PCT/JP2015/063458, filed on May 11, 2015.

(30) Foreign Application Priority Data

Sep. 22, 2014 (JP) ................. 2014-192720

(51) Int. Cl.
*B41J 11/04* (2006.01)
*H04N 1/08* (2006.01)
(Continued)

(52) U.S. Cl.
CPC .......... *H04N 1/086* (2013.01); *B41J 11/0085* (2013.01); *H04N 1/0664* (2013.01); *H04N 1/0821* (2013.01); *H04N 2201/0081* (2013.01)

(58) Field of Classification Search
CPC ...... B41J 11/007; B41J 25/304; B41J 13/103; B41J 13/0054; B41J 13/106; B41J 13/18;
(Continued)

(56) References Cited

U.S. PATENT DOCUMENTS 6,394,596 B1 * 5/2002 Wotton ................. B41J 11/007
347/104
6,400,387 B1 * 6/2002 Kerr ....................... B41J 13/226
347/198
(Continued)

FOREIGN PATENT DOCUMENTS

JP  2003-209663 A  7/2003
JP  2005-126215 A  5/2005
(Continued)

OTHER PUBLICATIONS

International Search Report issued in PCT/JP2015/063458; dated Jun. 30, 2015.
(Continued)

*Primary Examiner* — Kristal Feggins
(74) *Attorney, Agent, or Firm* — Studebaker & Brackett PC

(57) ABSTRACT

There are provided an image reading device and a printing apparatus that can reduce an influence of the shadows of suction holes. Suction holes, which are used to suck a sheet, are arranged on the peripheral surface of a drum that transports the sheet. The suction holes are arranged in grooves that are formed along a direction orthogonal to a transport direction. Accordingly, since an influence of the shadows of the suction holes can be reduced even in a case in which density unevenness is inspected on the basis of a read image, the false detection of density unevenness can be prevented.

17 Claims, 30 Drawing Sheets

(51) Int. Cl.
*B41J 11/00* (2006.01)
*H04N 1/06* (2006.01)

(58) Field of Classification Search
CPC ........ B41J 13/223; B41J 13/226; B41J 13/24; B41J 11/02; B41J 11/04; B41J 11/0085
See application file for complete search history.

(56) References Cited

U.S. PATENT DOCUMENTS

| | | |
|---|---|---|
| 2008/0283369 A1 | 11/2008 | Miyamoto |
| 2013/0020755 A1* | 1/2013 | Kitazawa ............. B65H 3/0833 271/108 |
| 2013/0293611 A1 | 11/2013 | Ueshima |
| 2014/0176655 A1 | 6/2014 | Hattori |

FOREIGN PATENT DOCUMENTS

| | | |
|---|---|---|
| JP | 2008-280160 A | 11/2008 |
| JP | 2010-076224 A | 4/2010 |
| JP | 2013-049567 A | 3/2013 |
| JP | 2013-233682 A | 11/2013 |

OTHER PUBLICATIONS

Written Opinion issued in PCT/JP2015/063458; dated Jun. 30, 2015.

* cited by examiner

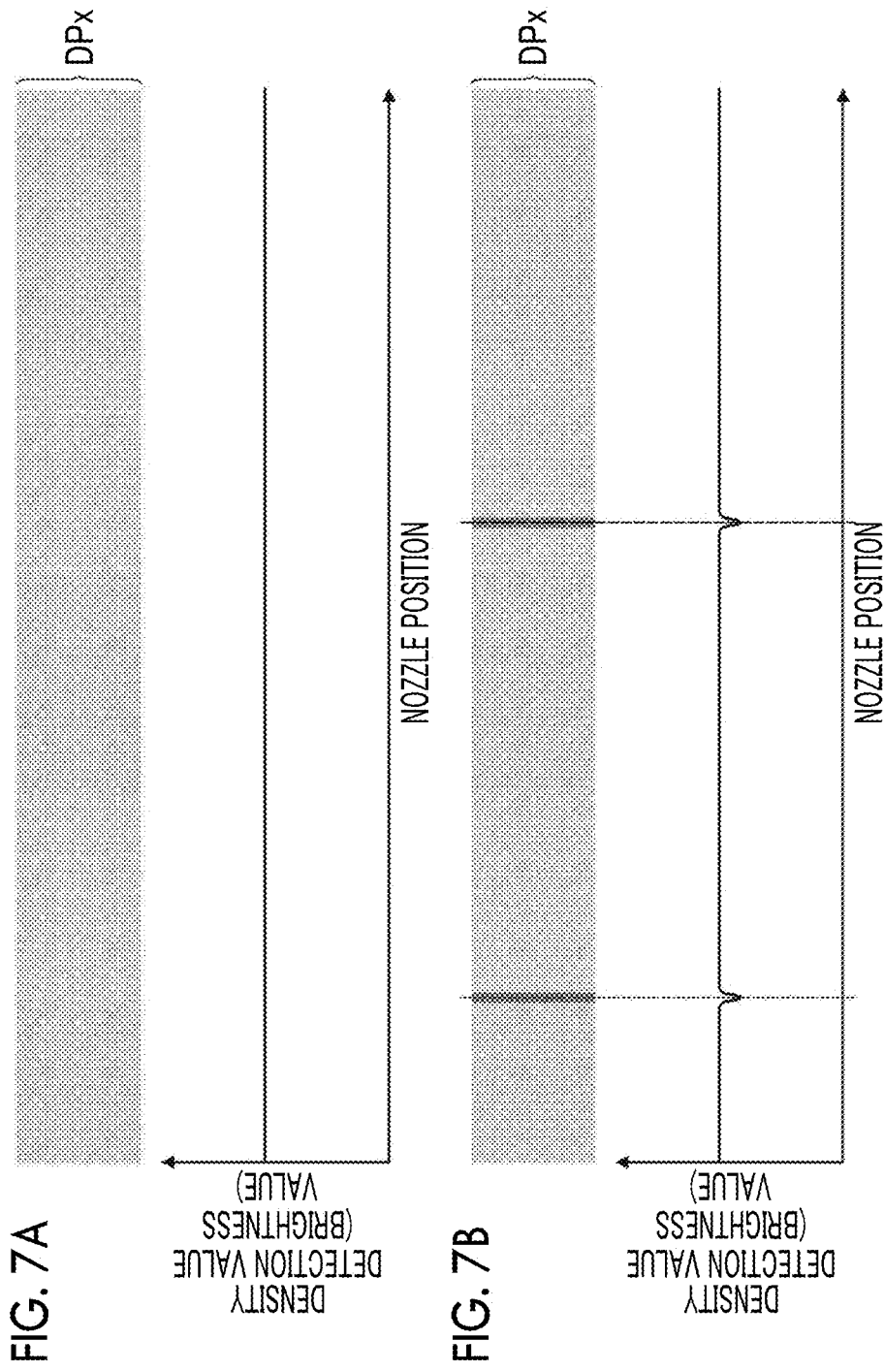

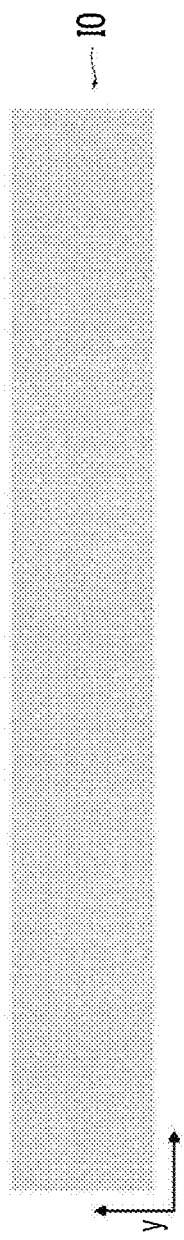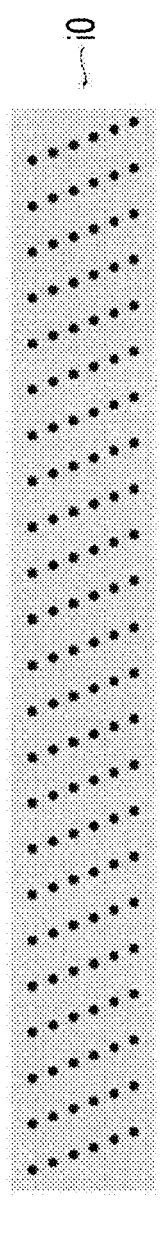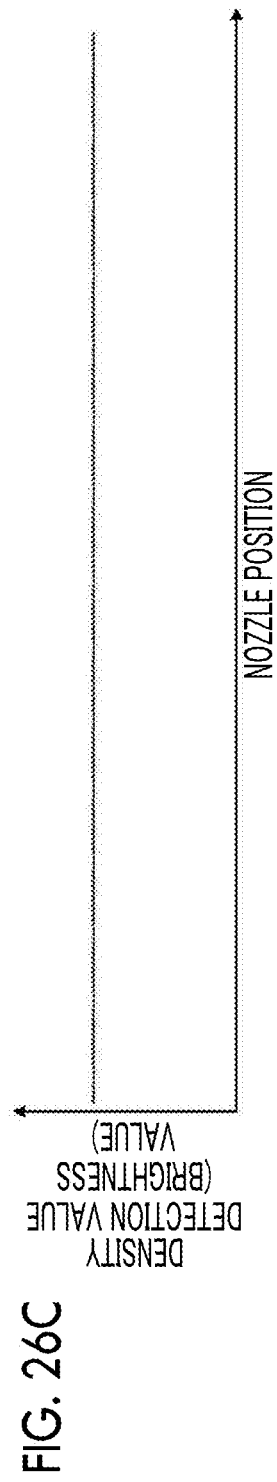
FIG. 26A
FIG. 26B
FIG. 26C

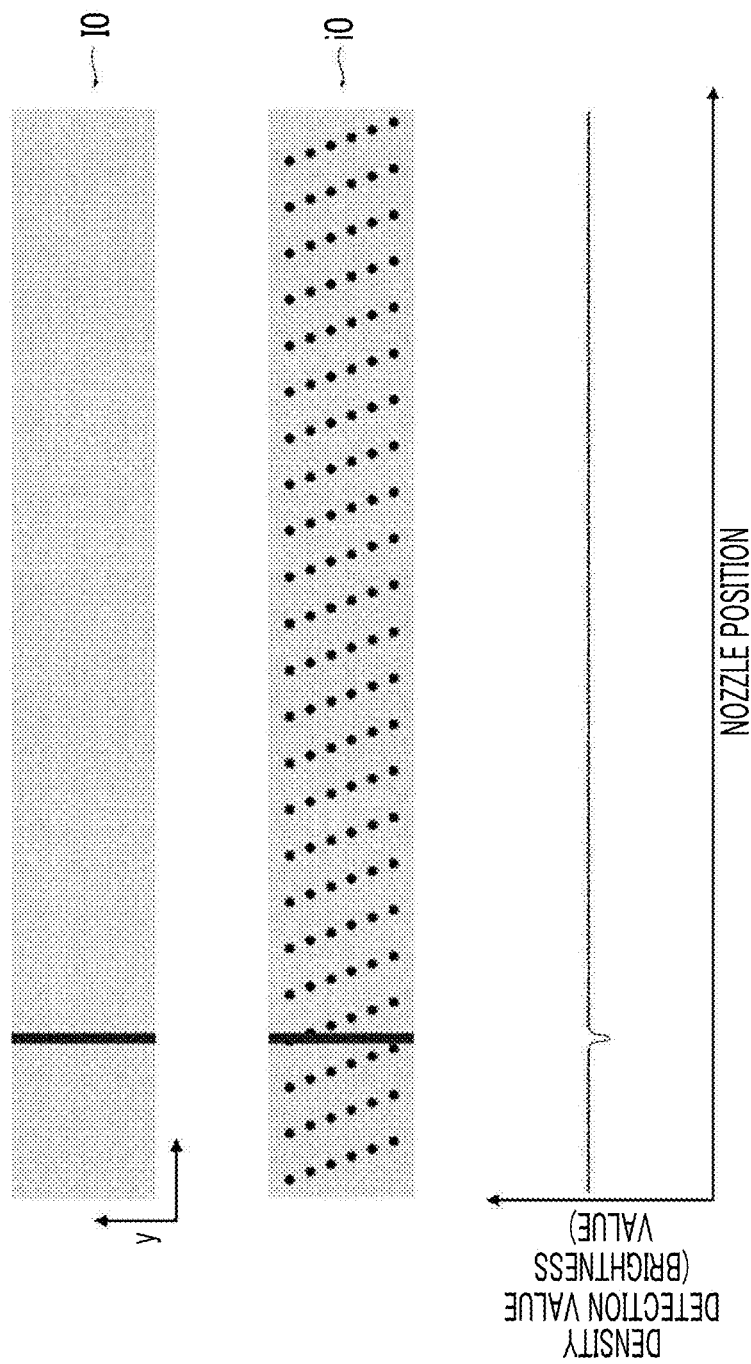

IMAGE READING DEVICE AND PRINTING APPARATUS

CROSS-REFERENCE TO RELATED APPLICATIONS

This application is a Continuation of PCT International Application No. PCT/JP2015/063458 filed on May 11, 2015, which claims priority under 35 U.S.C §119(a) to Japanese Patent Application No. 2014-192720 filed on Sep. 22, 2014. Each of the above application(s) is hereby expressly incorporated by reference, in its entirety, into the present application.

BACKGROUND OF THE INVENTION

1. Field of the Invention

The present invention relates to an image reading device and a printing apparatus that include a transport unit for transporting a medium by using negative pressure.

2. Description of the Related Art

Transport using a belt and transport using a drum are known as a method of transporting a medium in an image reading device. In the transport using a belt, a medium is transported in a sub-scanning direction while being sucked on the peripheral surface of an endless belt going around (for example, JP2003-209663A and the like). In the transport using a drum, a medium is transported in a sub-scanning direction while being sucked on the peripheral surface of a rotating drum (for example, JP2005-126215A and the like).

In both the transport using a belt and the transport using a drum, negative pressure is used for the suction of the medium. In the case of the transport using a belt, a plurality of suction holes are formed on the peripheral surface of the belt and a medium is sucked on the peripheral surface of the belt by the suction of air from the inside of the belt. In the case of the transport using a drum, a plurality of suction holes are formed on the peripheral surface of the drum and a medium is sucked on the peripheral surface of the drum by the suction of air from the inside of the drum.

SUMMARY OF THE INVENTION

However, since the shadows of the suction holes appear on the surface of a thin medium in a case in which suction holes are formed on the peripheral surfaces of the belt and the drum, there is a drawback that false recognition between the shadows of the suction holes and density unevenness may occur when an image is read.

The invention has been made in consideration of the above-mentioned circumstances and an object of the invention is to provide an image reading device and a printing apparatus that can reduce an influence of the shadows of suction holes.

Means for achieving the above-mentioned object are as follows.

(1) An image reading device comprising: a transport unit for transporting a sheet-like medium while sucking the medium on a medium holding surface on which suction holes are regularly arranged; and an image reading unit for reading an image from the medium transported by the transport unit. Grooves, which cross a holding area for the medium in a direction orthogonal to a transport direction, are regularly arranged along the transport direction on the medium holding surface, and the suction holes arranged on the medium holding surface are arranged in the grooves.

According to this aspect, the medium holding surface is provided with the grooves. The grooves are formed so as to cross the holding area for the medium in a direction orthogonal to a transport direction, that is, in a main scanning direction, and are regularly arranged along the transport direction that is a sub-scanning direction. Here, "regularly arranged" means that the grooves are repeatedly arranged with regularity. All the suction holes provided on the medium holding surface are arranged in the grooves. Accordingly, since an influence of the shadows of the suction holes can be reduced even in a case in which density unevenness is inspected on the basis of a read image, the false detection of density unevenness can be prevented. That is, in this aspect, shadows have the shape of the shadows of the grooves even in a case in which the shadows appear on the surface of the medium. Accordingly, the shadows uniformly appear in the main scanning direction. For this reason, when seen in the main scanning direction, the seeming density of a portion where the suction hole is present is substantially equal to the seeming density of a portion where the suction hole is not present even in a case in which the suction hole is present on a main scanning line on which attention is focused. Accordingly, false detection between the shadows of the suction holes and density unevenness, which is caused by an influence of the shadows of the suction holes, can be prevented. Further, even in a case in which the unevenness of the image is determined on the basis of a brightness value integrated in the sub-scanning direction, the integrated brightness value is constant in the main scanning direction. Accordingly, false detection between the shadows of the suction holes and density unevenness, which is caused by an influence of the shadows of the suction holes, can be prevented even in this case.

(2) The image reading device according to (1), in which the grooves are formed so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

According to this aspect, the grooves are formed so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit. That is, the depth and the width of each groove are determined so that the integrated value of brightness in the transport direction, which is to be output, is constant over the entire area of a medium in a direction orthogonal to the transport direction and parallel to the medium holding surface. Accordingly, the grooves, which are formed on the medium holding surface, can be optimized.

(3) The image reading device according to (1) or (2), in which the suction holes are arranged at a first interval in a direction orthogonal to the transport direction and are arranged at a second interval in the transport direction, and the grooves are arranged at the same interval as the interval between the suction holes in the transport direction.

According to this aspect, the suction holes are arranged at a first interval in a direction orthogonal to the transport direction and are arranged at a second interval in the transport direction. Since the suction holes are arranged in the grooves, the grooves are arranged at the same interval as the interval between the suction holes in the transport direction. That is, the grooves are regularly arranged at the second interval.

(4) An image reading device comprising: a transport unit for transporting a sheet-like medium while sucking the medium on a medium holding surface on which suction holes are regularly arranged; and an image reading unit for reading an image from the medium transported by the transport unit. When a line of the suction holes in a direction orthogonal to a transport direction is referred to as a row and a line of the suction holes in the transport direction is referred to as a column, the suction holes arranged on each row are arranged on the next columns of the suction holes arranged on the previous row, the same number of the suction holes are arranged on the respective columns, and the suction holes arranged on the respective columns are arranged so that the adjacent suction holes are adjacent to each other in a case in which the suction holes arranged on the respective columns are projected on a straight line orthogonal to the transport direction and parallel to the medium holding surface.

According to this aspect, when a line of the suction holes in the main scanning direction, which is a direction orthogonal to a transport direction, is referred to as a row and a line of the suction holes in the sub-scanning direction, which is the transport direction, is referred to as a column, the suction holes arranged as described below. That is, the suction holes arranged on each row are arranged on the next columns of the suction holes arranged on the previous row. Further, the same number of the suction holes are arranged on the respective columns. Furthermore, the suction holes arranged on the respective columns are arranged so that the adjacent suction holes are adjacent to each other in a case in which the suction holes arranged on the respective columns are projected on a straight line orthogonal to the transport direction and parallel to the medium holding surface. Accordingly, when the unevenness of the image is determined on the basis of a brightness value integrated in the sub-scanning direction, the integrated brightness value becomes substantially constant in the main scanning direction. Therefore, false detection between the shadows of the suction holes and density unevenness, which is caused by an influence of the shadows of the suction holes, can be prevented.

(5) The image reading device according to (4), in which the suction holes are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

According to this aspect, the suction holes are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit. That is, the diameter of each suction hole and an interval between the suction holes are determined so that the integrated value of brightness in the transport direction, which is to be output, is constant over the entire area of a medium in a direction orthogonal to the transport direction and parallel to the medium holding surface. Accordingly, the arrangement of the suction holes can be optimized.

(6) The image reading device according to any one of (1) to (5), in which protrusions are further arranged regularly on the medium holding surface; and when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

According to this aspect, the protrusions are arranged on the medium holding surface. When a line of the protrusions in the main scanning direction, which is a direction orthogonal to the transport direction, is referred to as a row and a line of the protrusions in the sub-scanning direction, which is the transport direction, is referred to as a column, the protrusions are arranged as described below. That is, the protrusions, which are arranged on each row, are arranged on the next columns of the protrusions that are arranged on the previous row. Further, the same number of protrusions are arranged on the respective columns. Furthermore, the protrusions arranged on the respective columns are arranged so that adjacent protrusions are adjacent to each other in a case in which the protrusions arranged on the respective columns are projected on a straight line orthogonal to the transport direction and parallel to the medium holding surface. That is, the protrusions are arranged according to the same arrangement rule as the suction holes. Accordingly, since an influence of shadows caused by the protrusions can be reduced, false detection between the shadows of the protrusions and density unevenness can be prevented when the unevenness of the image is determined on the basis of a brightness value integrated in the sub-scanning direction.

(7) The image reading device according to (6), in which the protrusions are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

According to this aspect, the protrusions are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit. That is, the diameter of each protrusion, an interval between the protrusions, and the overlap area between the protrusions are determined so that the integrated value of brightness in the transport direction, which is to be output, is constant over the entire area of a medium in a direction orthogonal to the transport direction and parallel to the medium holding surface. Accordingly, the arrangement of the protrusions can be optimized.

(8) The image reading device according to any one of (1) to (7), in which the transport unit is a rotating drum and a peripheral surface of the drum forms the medium holding surface.

According to this aspect, the transport unit is formed of a rotating drum. A medium is transported while being held on the peripheral surface of the drum, which functions as the medium holding surface, by suction.

(9) The image reading device according to any one of (1) to (7), in which the transport unit is an endless belt going around, and a peripheral surface of the belt forms the medium holding surface.

According to this aspect, the transport unit is formed of an endless belt going around. A medium is transported while being held on the peripheral surface of the belt, which functions as the medium holding surface, by suction.

(10) A printing apparatus comprising: a printing unit; and the image reading device according to any one of (1) to (9).

According to this aspect, the printing apparatus comprises the printing unit and the image reading device according to any one of (1) to (9).

(11) The printing apparatus according to (10), in which the printing unit performs printing on a medium transported by the transport unit.

According to this aspect, printing is performed on a medium transported by the transport unit. That is, printing and reading are performed using the same transport unit.

(12) The printing apparatus according to (11), in which the printing unit prints an image by an ink jet method.

According to this aspect, the printing unit prints an image by an ink jet method.

(13) The printing apparatus according to any one of (10) to (12), further comprising: a density unevenness detecting section that detects presence/absence of density unevenness on the basis of image data read by the image reading device.

According to this aspect, the presence/absence of density unevenness is detected on the basis of image data read by the image reading device. Since an influence of the shadows of the suction holes to be seen on a medium can be reduced, density unevenness can be accurately detected from image data to be read.

According to the invention, an influence of the shadows of suction holes to be seen on a medium can be reduced.

BRIEF DESCRIPTION OF THE DRAWINGS

FIGS. 7A and 7B are graphs showing the detection results of the density of density patches.

Figure 9:
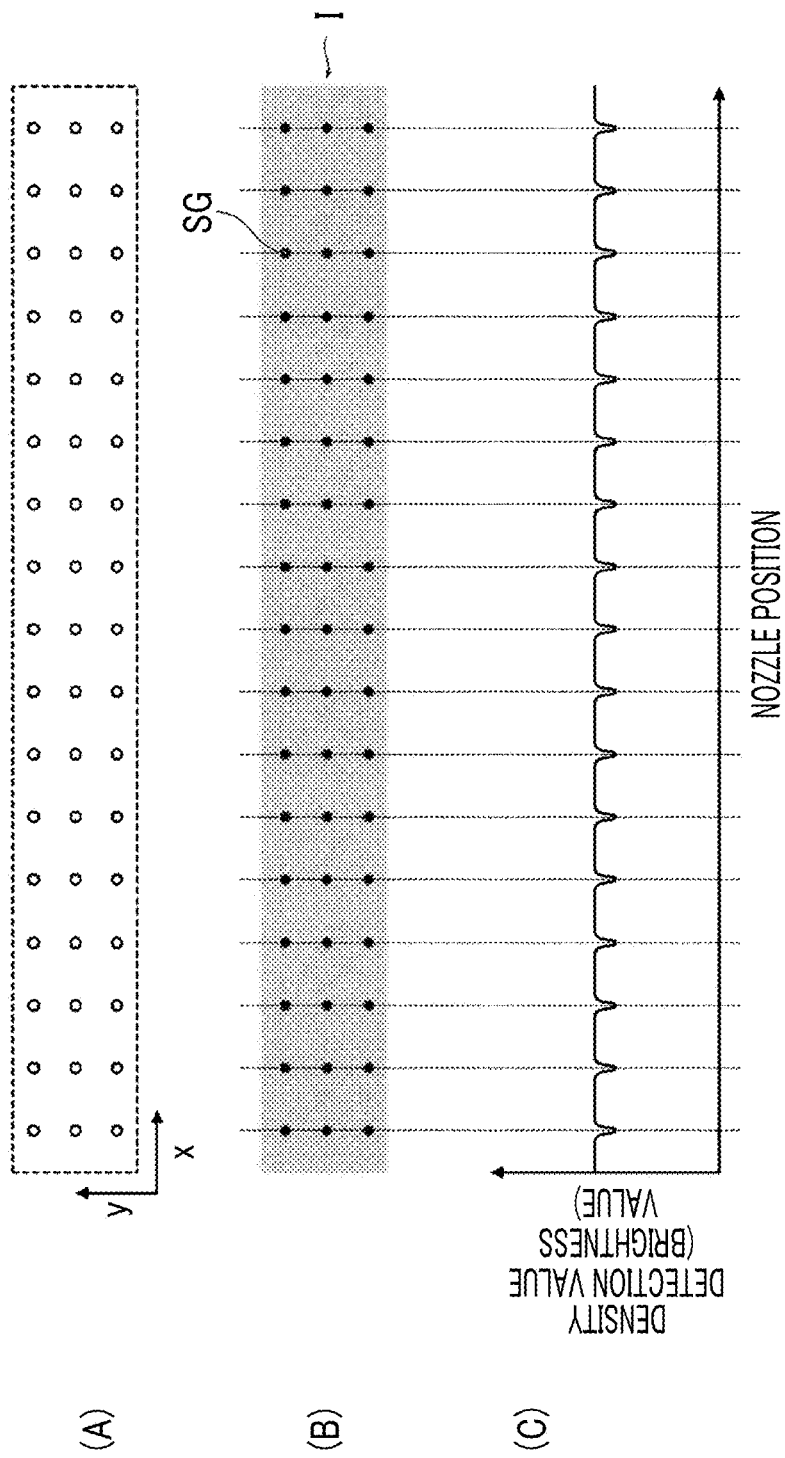

(A) to (C) of FIG. 9 are views illustrating an influence of the suction holes on the detection of density unevenness.

Figure 10:
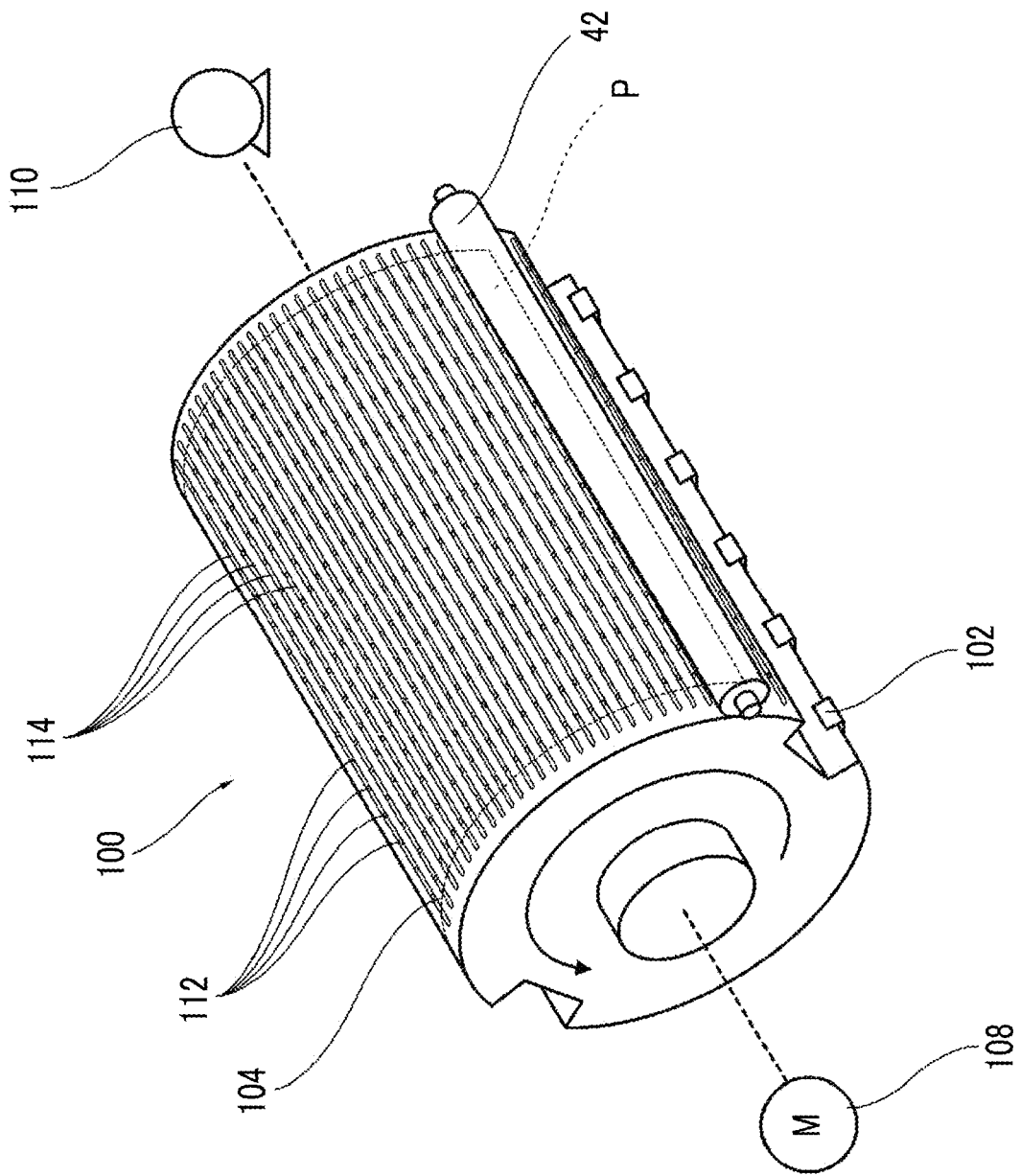

FIG. 10 is a perspective view showing the structure of a printing drum.

Figure 11:
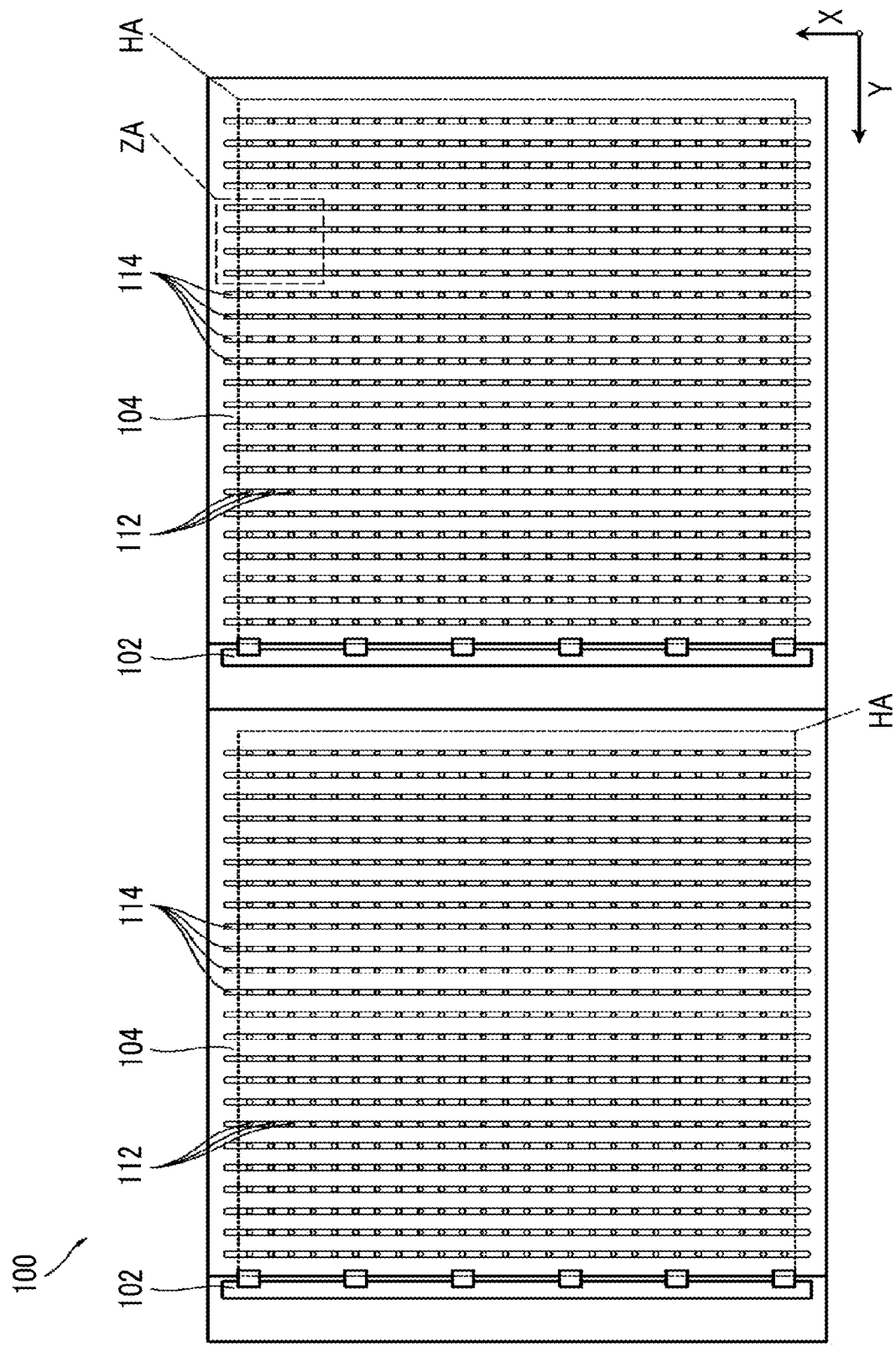

FIG. 11 is a development view showing the structure of the peripheral surface of the printing drum.

Figure 12:
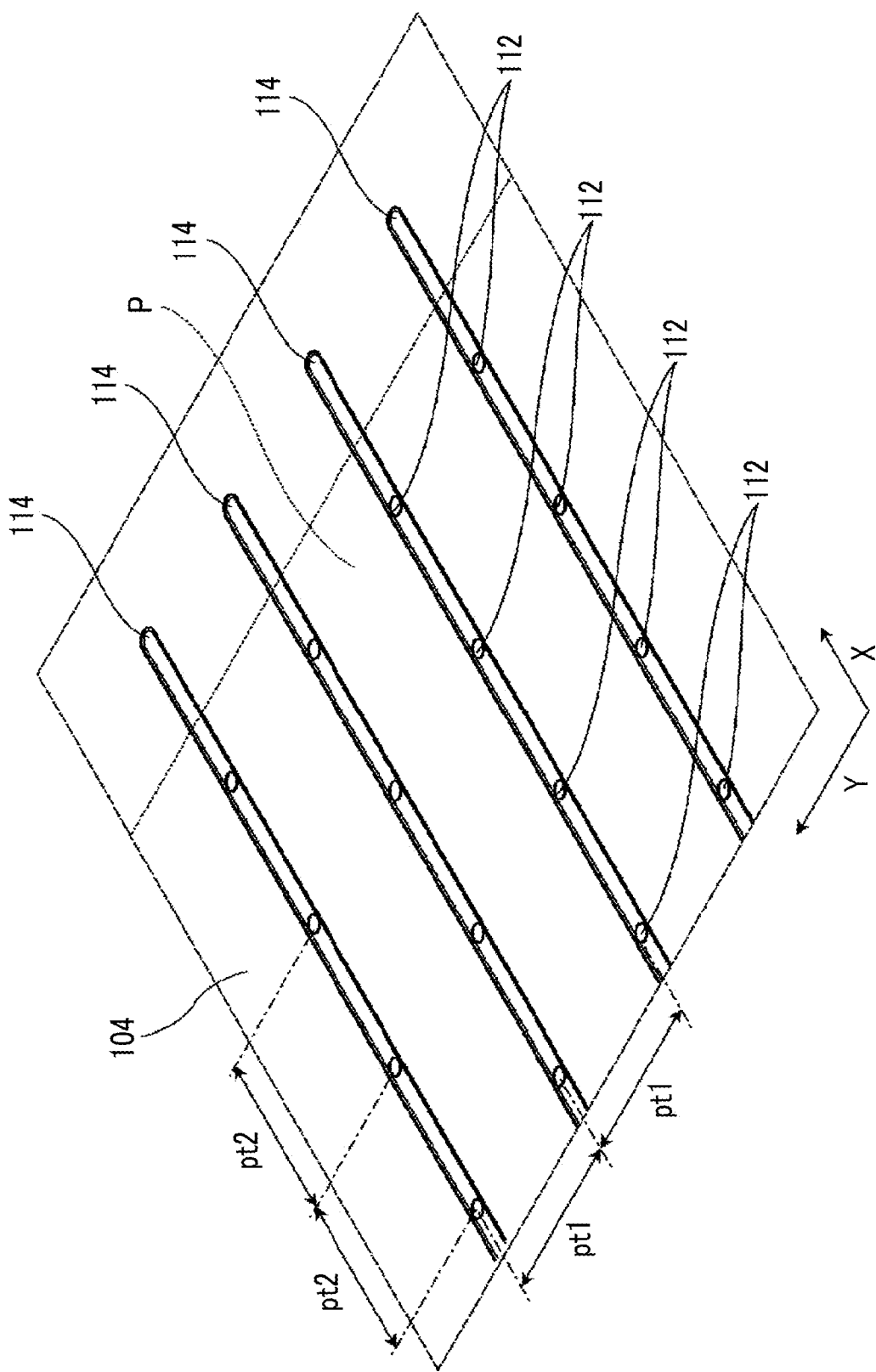

FIG. 12 is an enlarged perspective view of an area ZA that is a part of FIG. 11.

Figure 13:
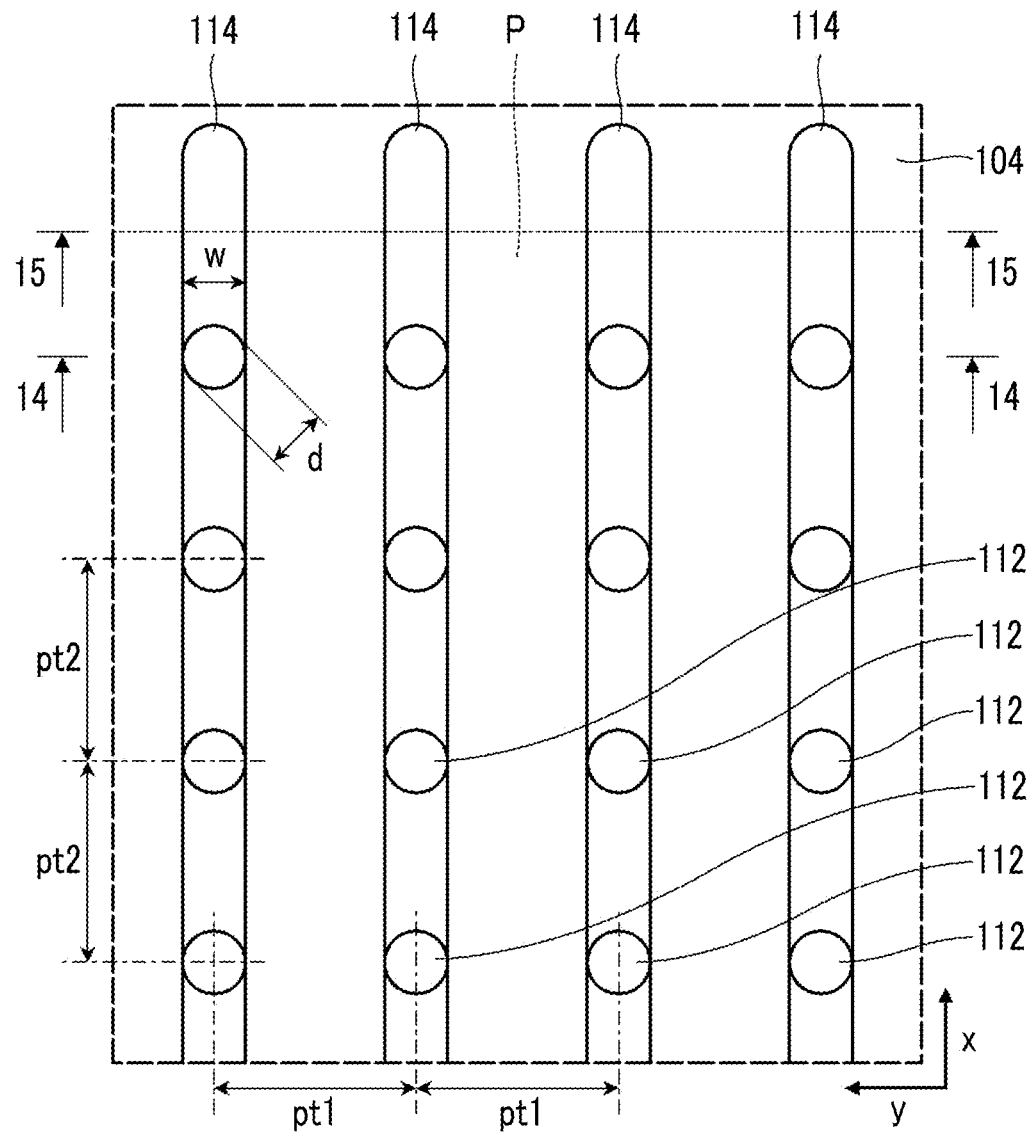

FIG. 13 is an enlarged view of an area that is a part of FIG. 11.

Figure 14:
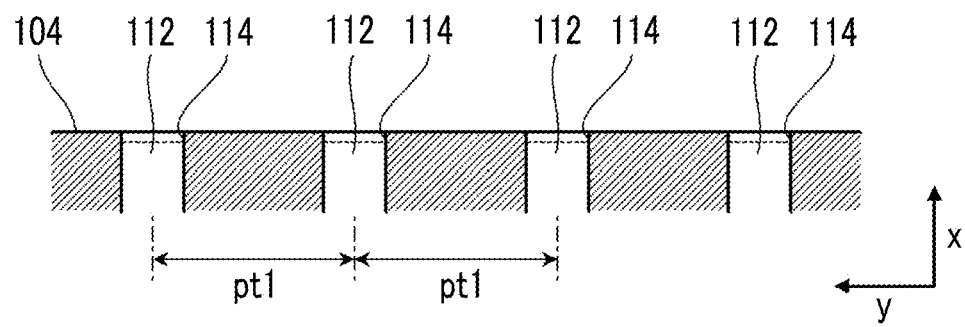

FIG. 14 is a cross-sectional view taken along line 14-14 of FIG. 13.

Figure 15:
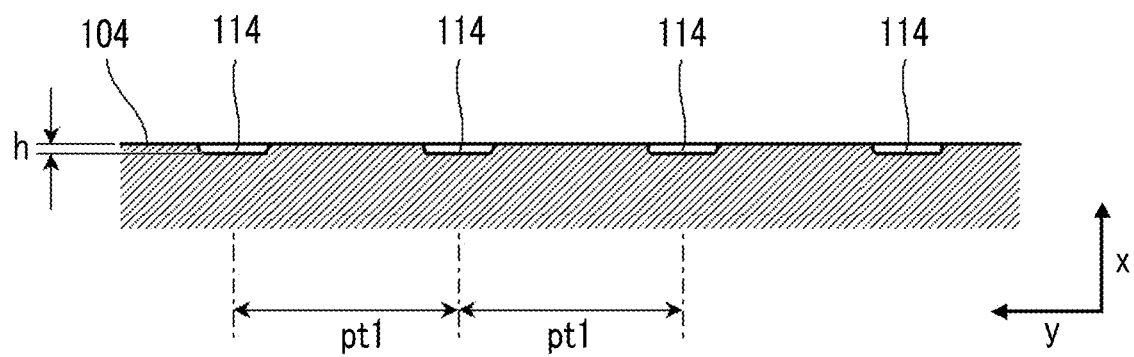

FIG. 15 is a cross-sectional view taken along line 15-15 of FIG. 13.

Figure 16:
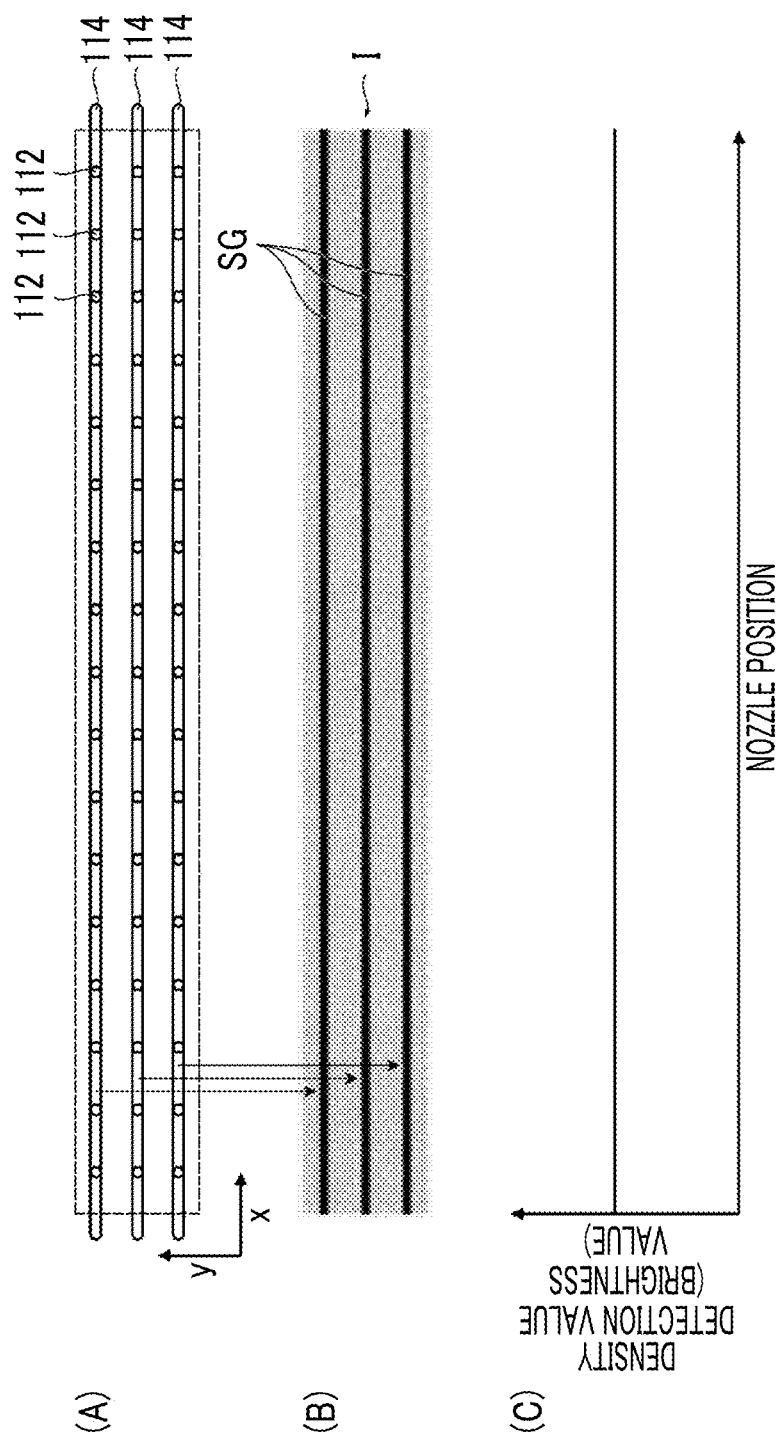

(A) to (C) of FIG. 16 are views illustrating the action of the printing drum of this embodiment.

Figure 17:
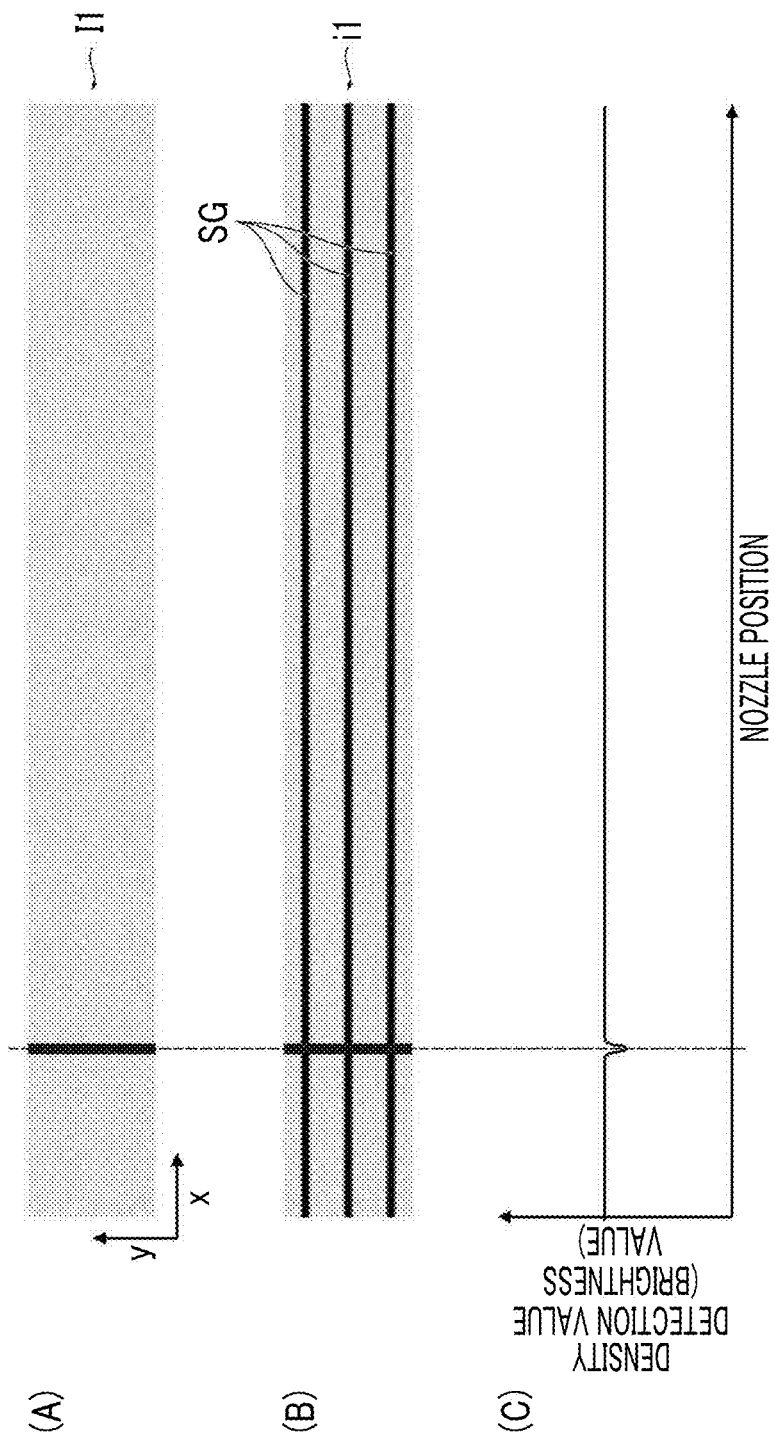

(A) to (C) of FIG. 17 are views illustrating the detection results of density that are obtained when a density patch having density unevenness is read.

Figure 18:
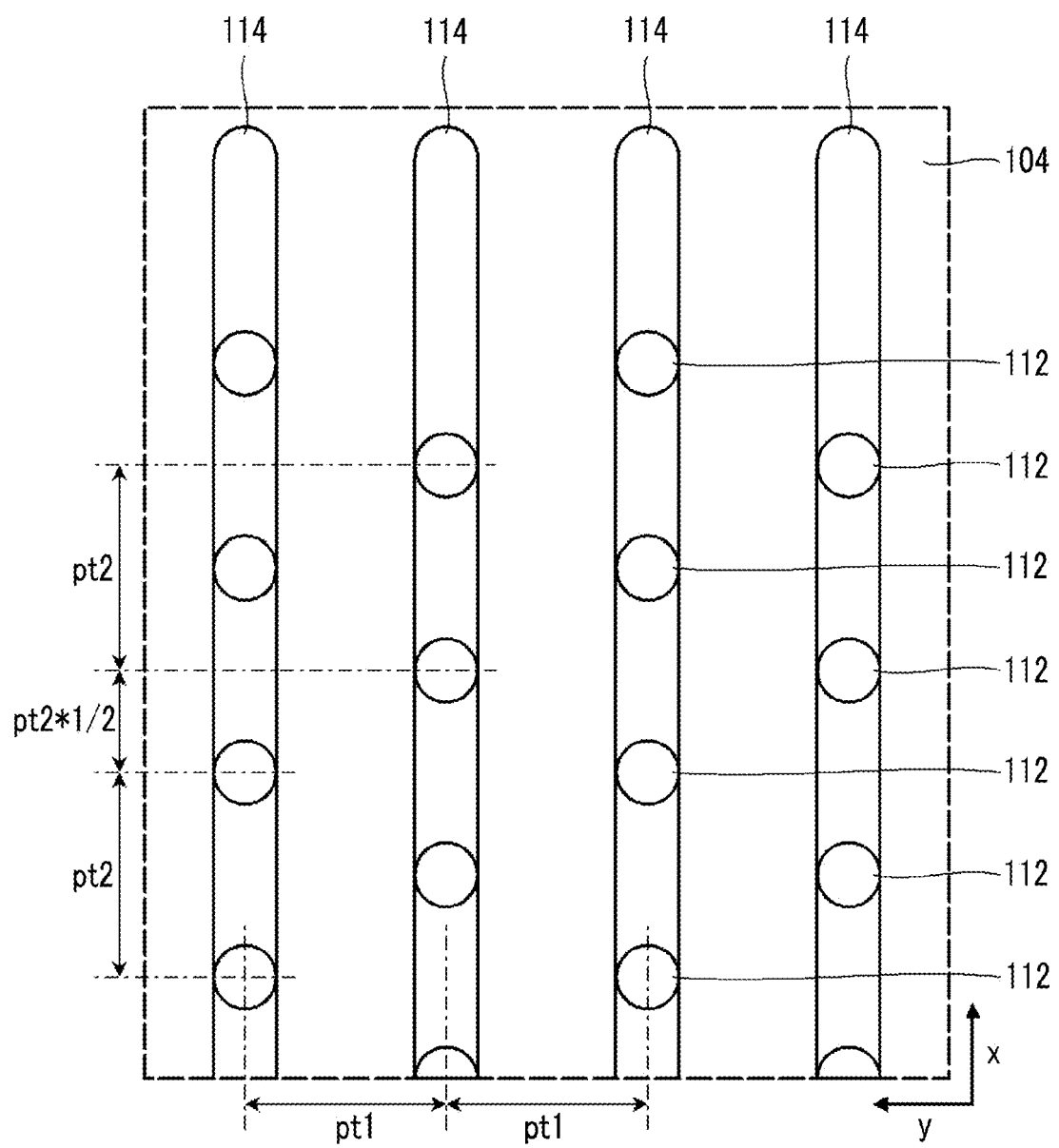

FIG. 18 is a view showing Modification example (1) of the arrangement of suction holes and grooves.

Figure 19:
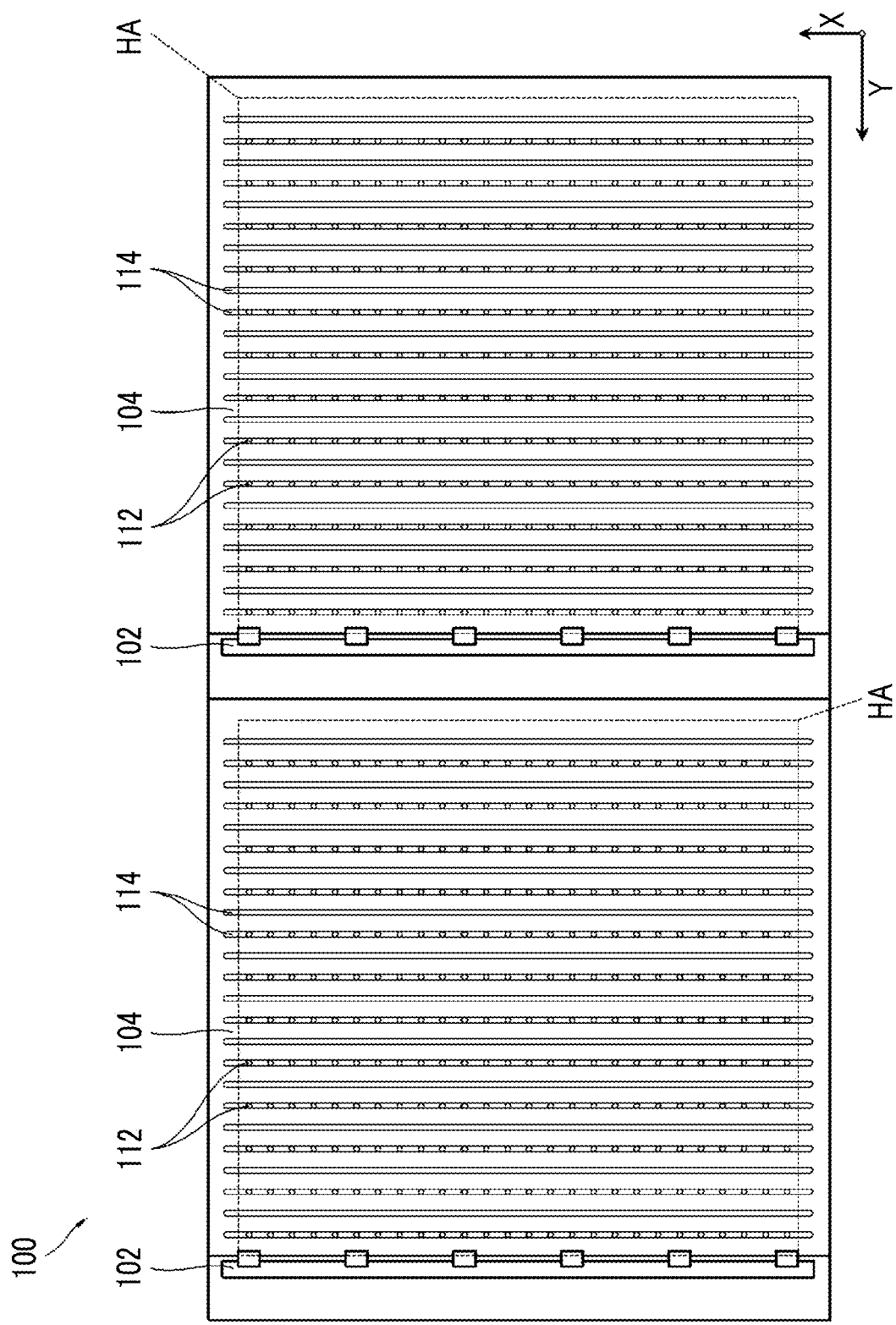

FIG. 19 is a view showing Modification example (2) of the arrangement of suction holes and grooves.

Figure 20:
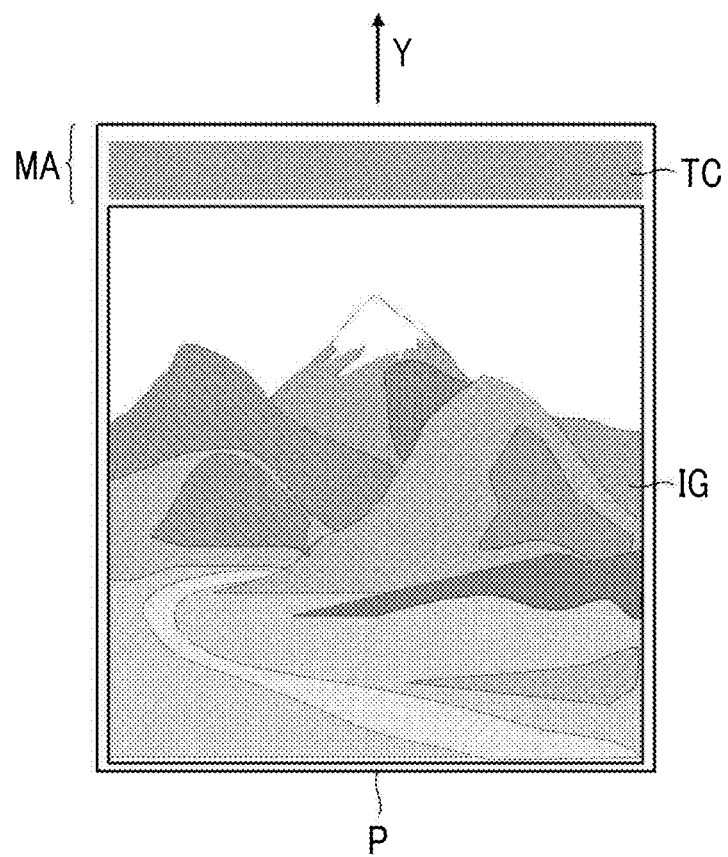

FIG. 20 is a view of a printed example of a test chart in a case in which the detection of density unevenness is performed during printing.

Figure 21:
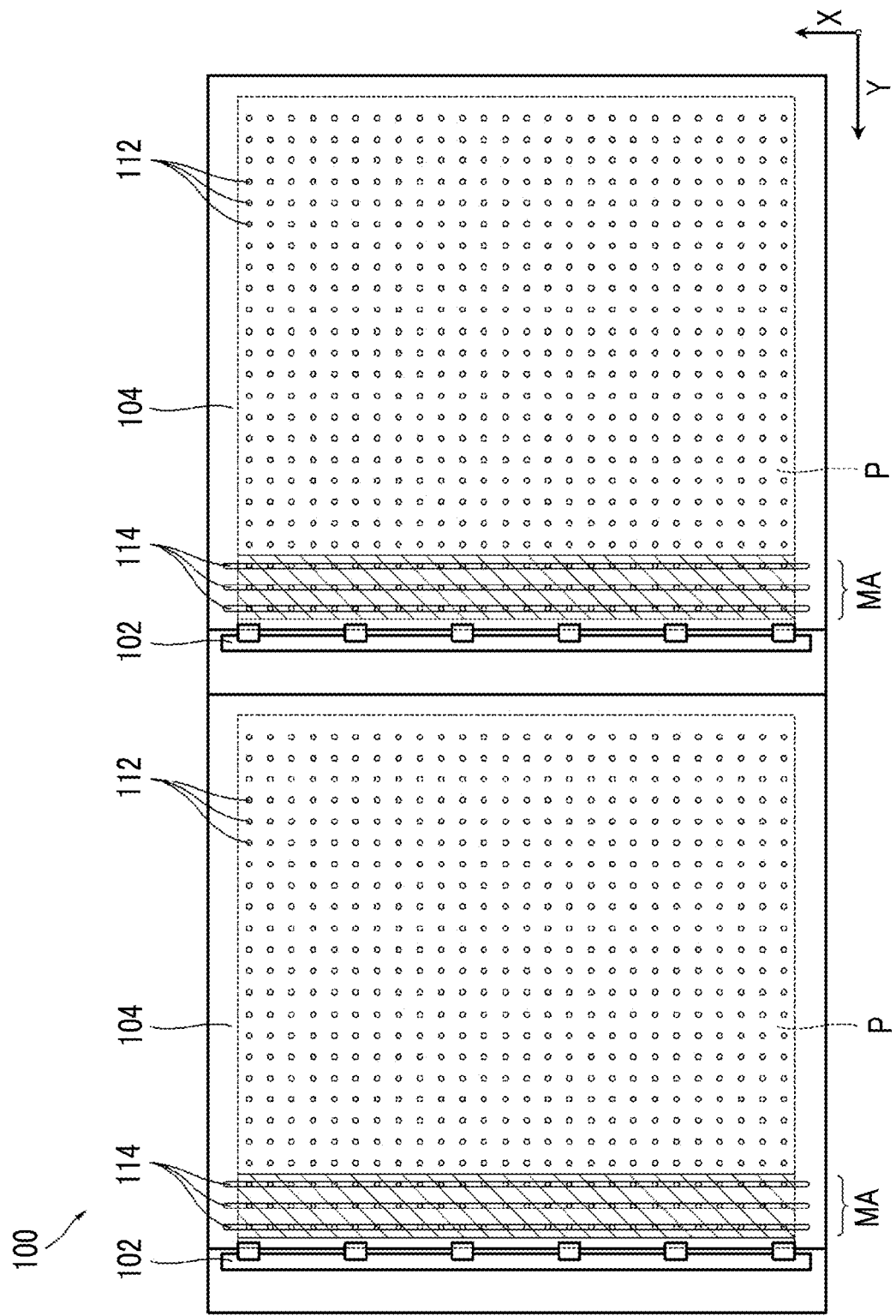

FIG. 21 is a development view of the peripheral surface of the printing drum in a case in which grooves are arranged only on a part of the peripheral surface.

Figure 22:
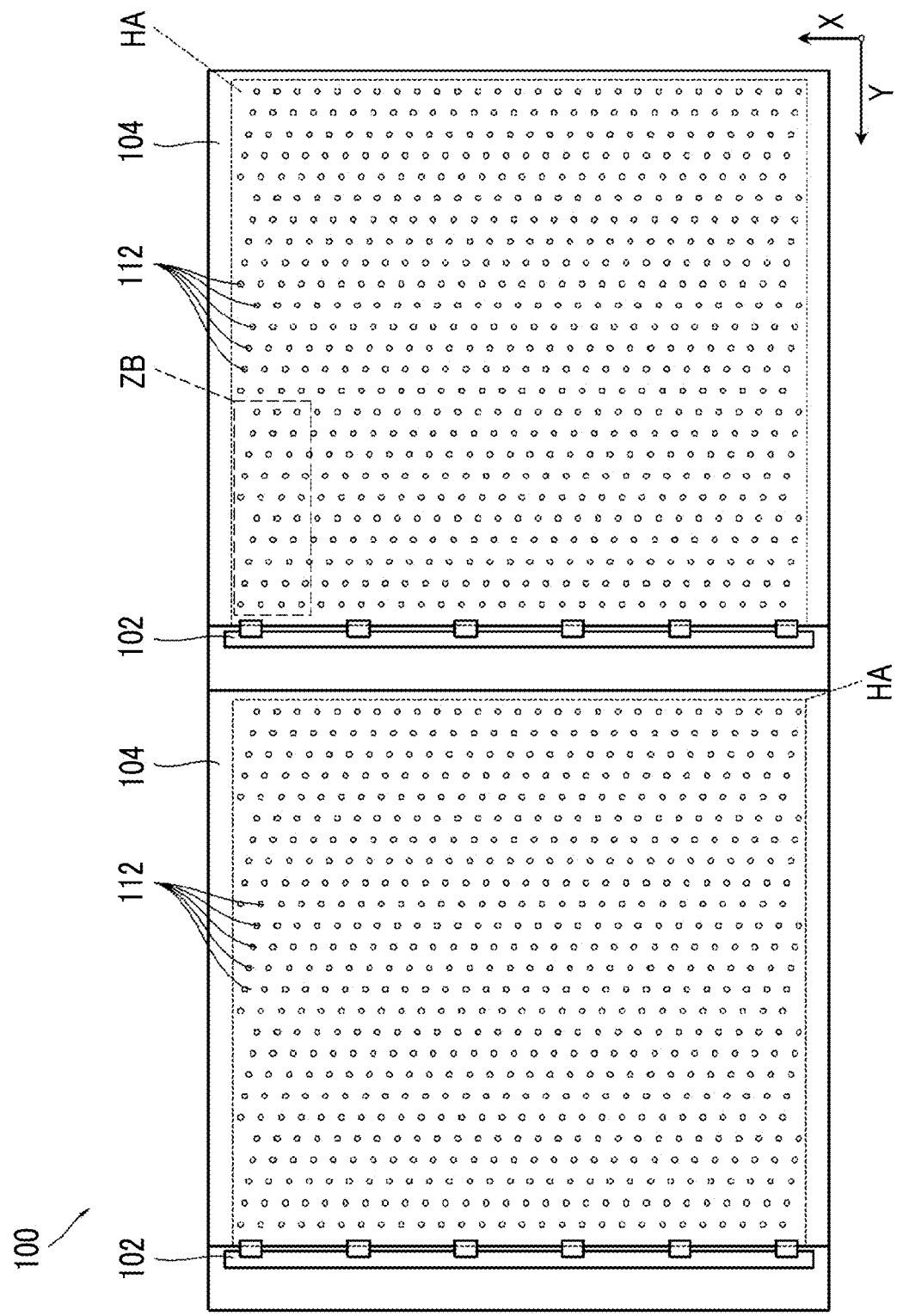

FIG. 22 is a development view showing the structure of the peripheral surface of a second embodiment of the printing drum.

Figure 23:
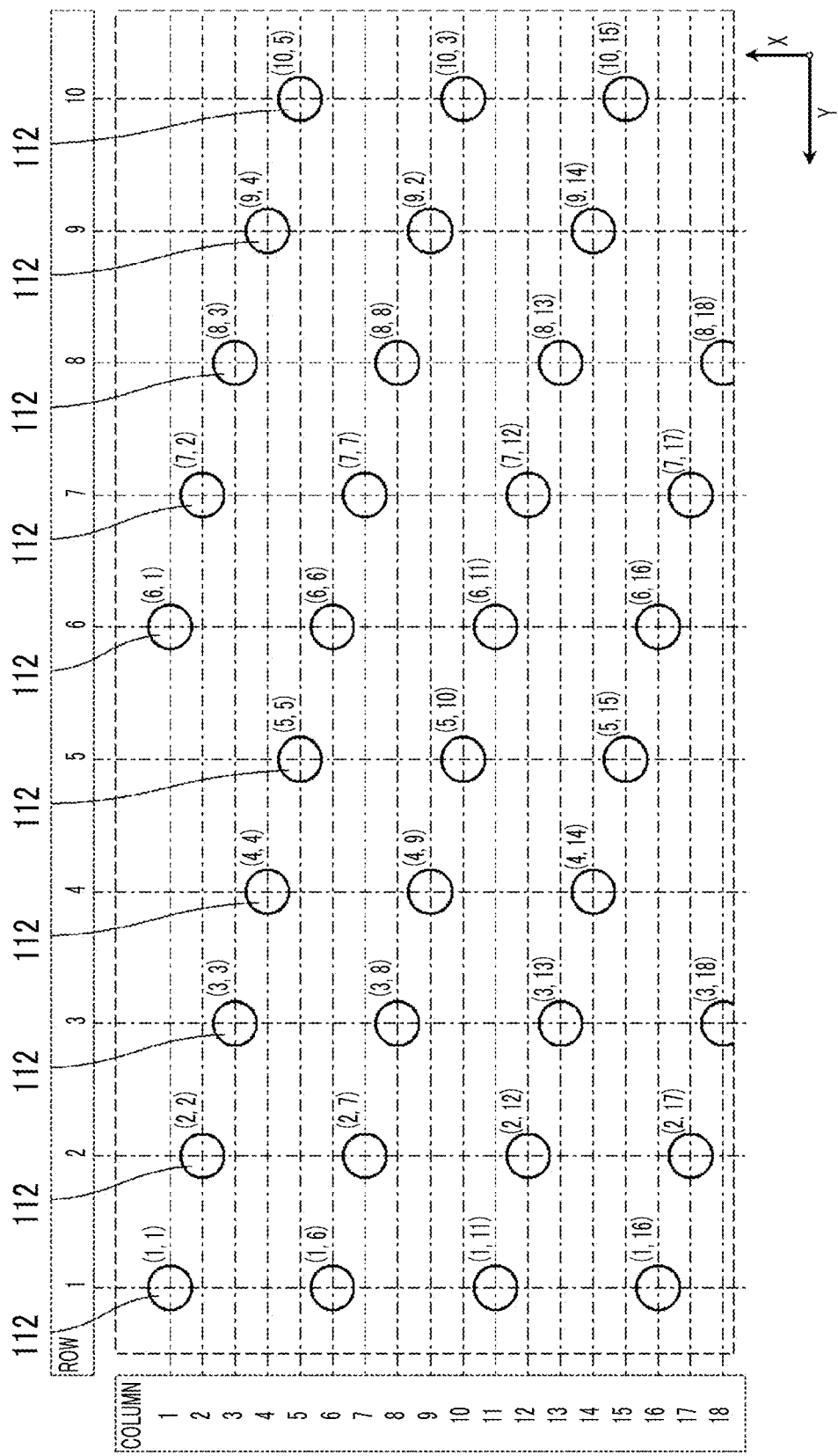

FIG. 23 is an enlarged view of an area ZB that is a part of FIG. 22.

Figure 24:
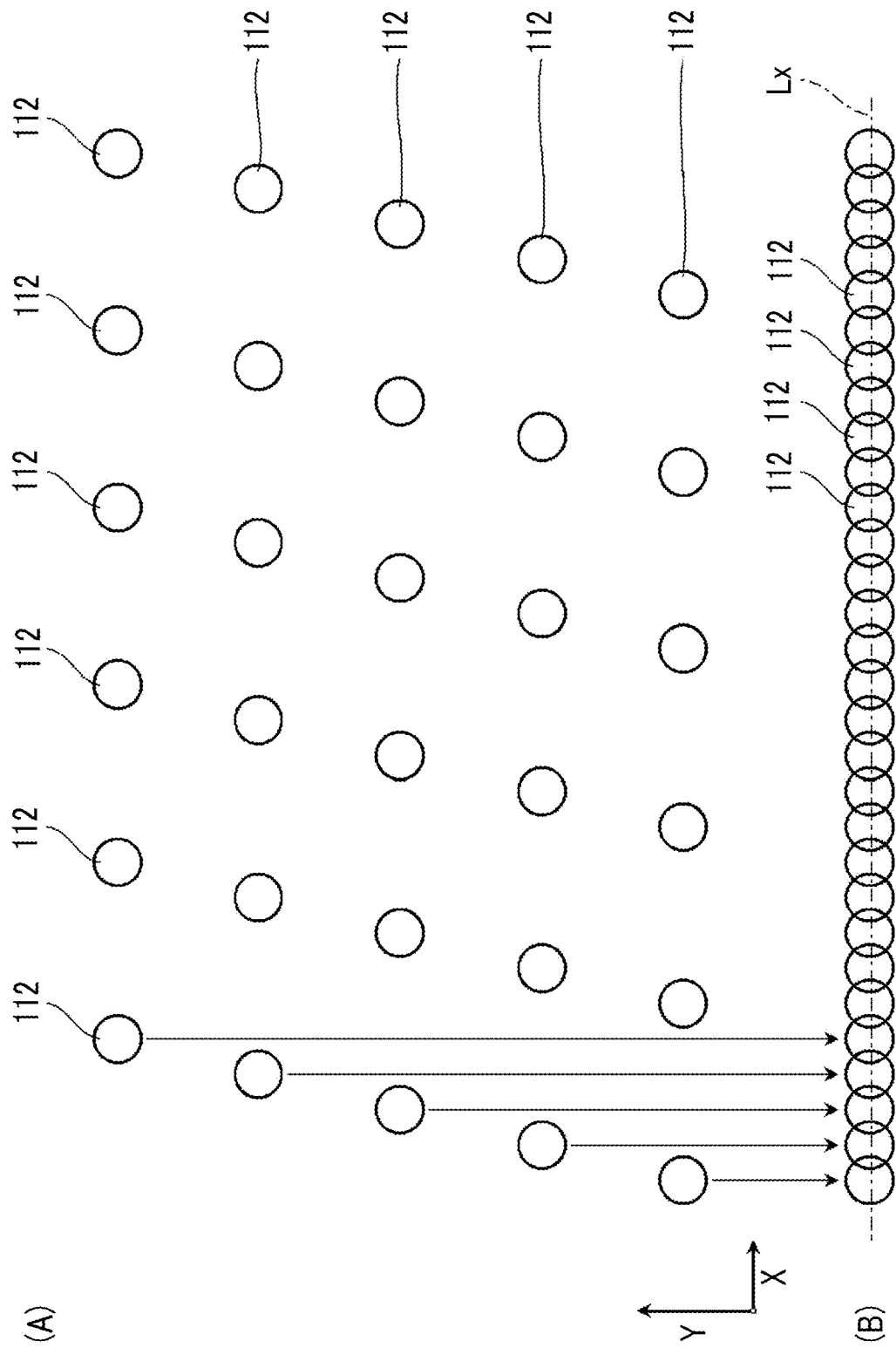

(A) and (B) of FIG. 24 are views illustrating an interval between suction holes in a row direction.

Figure 25:
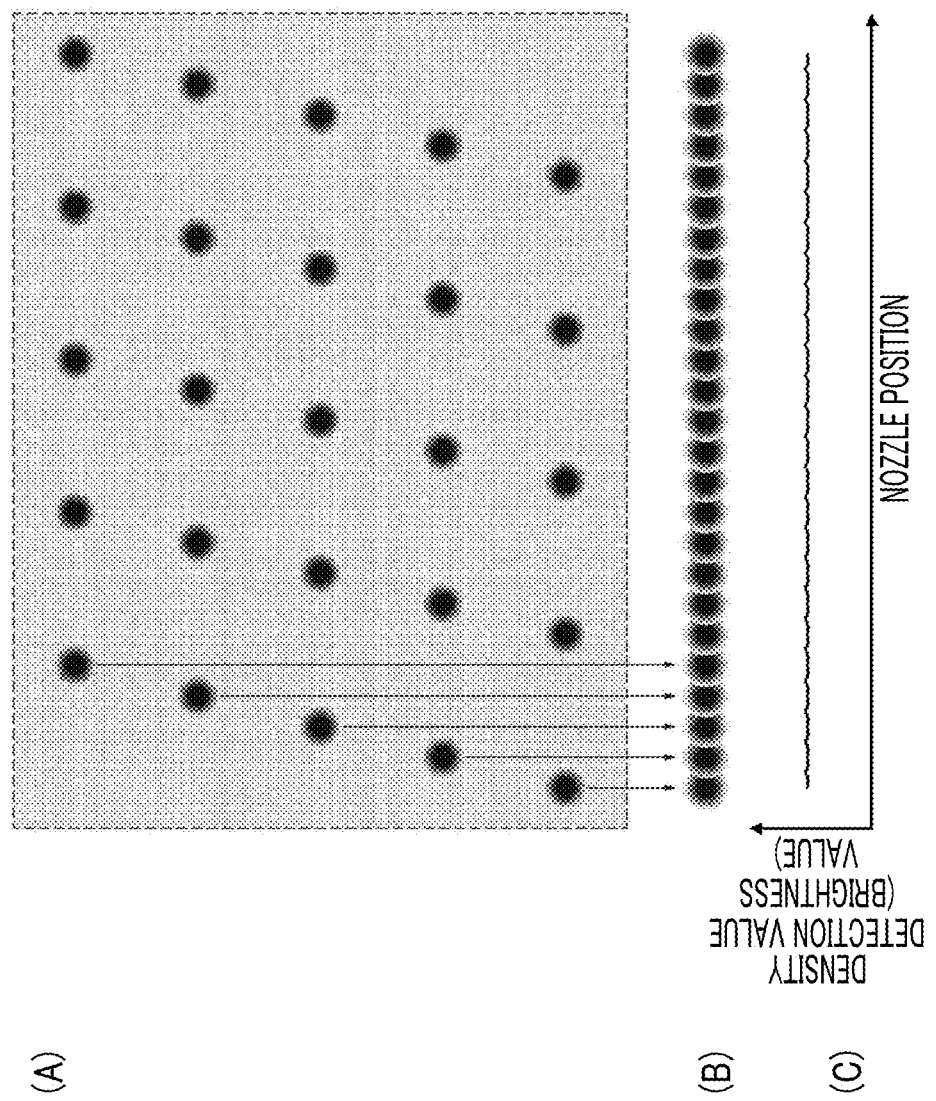

(A) to (C) of FIG. 25 are views illustrating the action of the printing drum of the second embodiment.

FIGS. 26A, 26B, and 26C are views illustrating the detection results of density that are obtained when a density patch not having density unevenness is read.

FIGS. 27A, 27B, and 27C are views illustrating the detection results of density that are obtained when a density patch having density unevenness is read.

Figure 28:
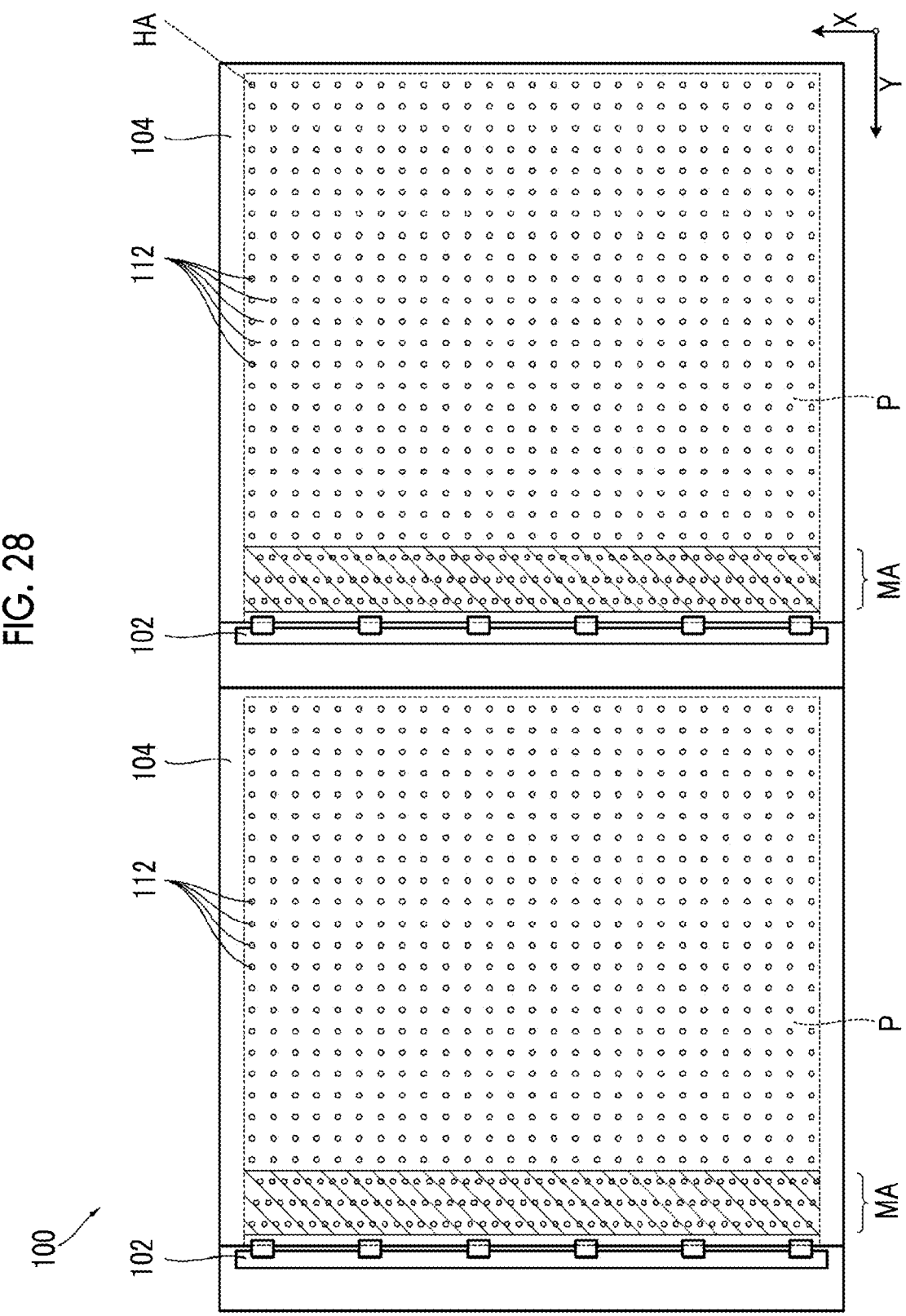

FIG. 28 is a development view of the peripheral surface of a printing drum which suction holes are arranged only on a part of an area thereof so as to satisfy a specific condition.

Figure 29:
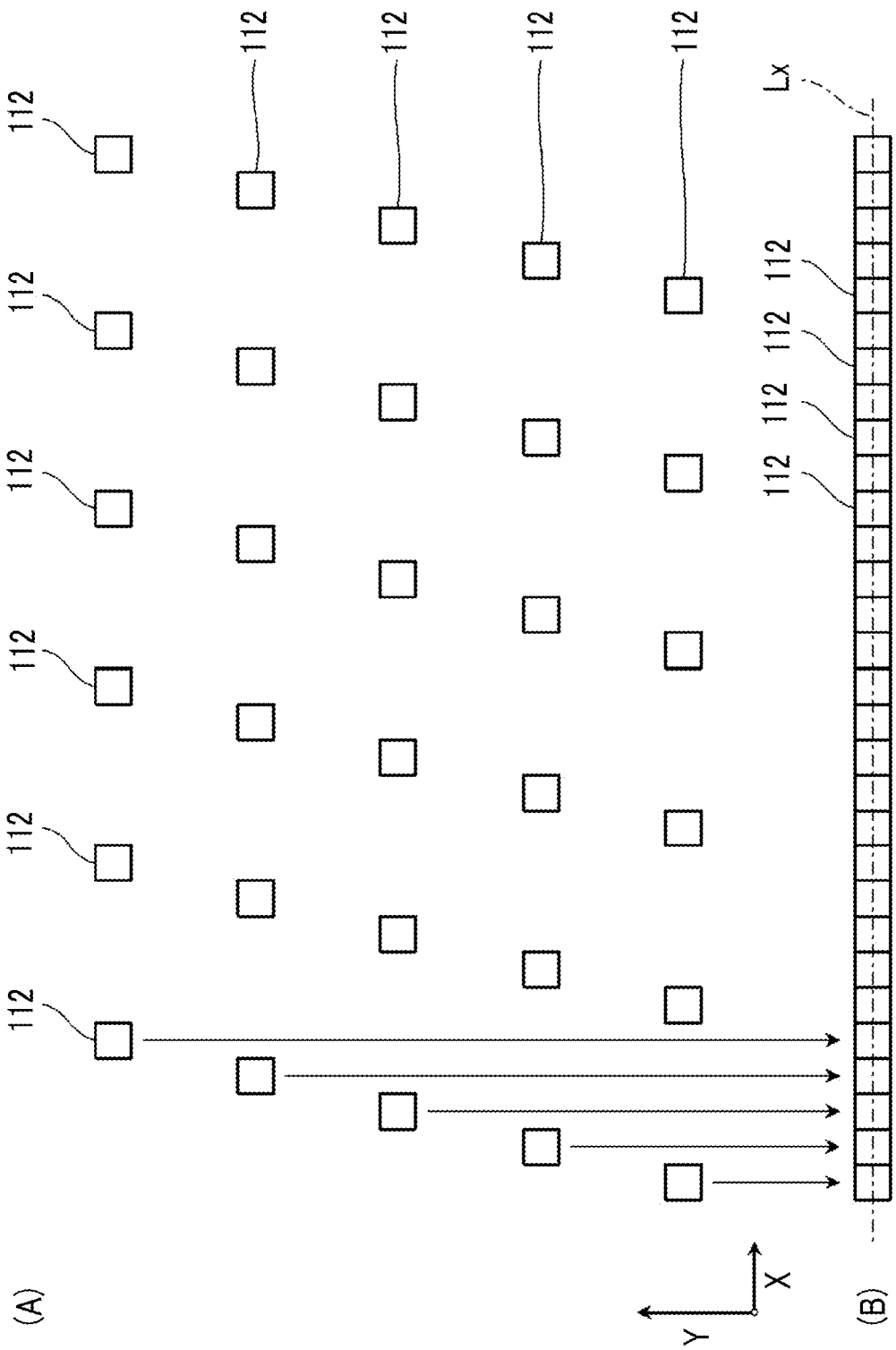

(A) and (B) of FIG. 29 are views illustrating Modification example of a suction hole.

Figure 30:
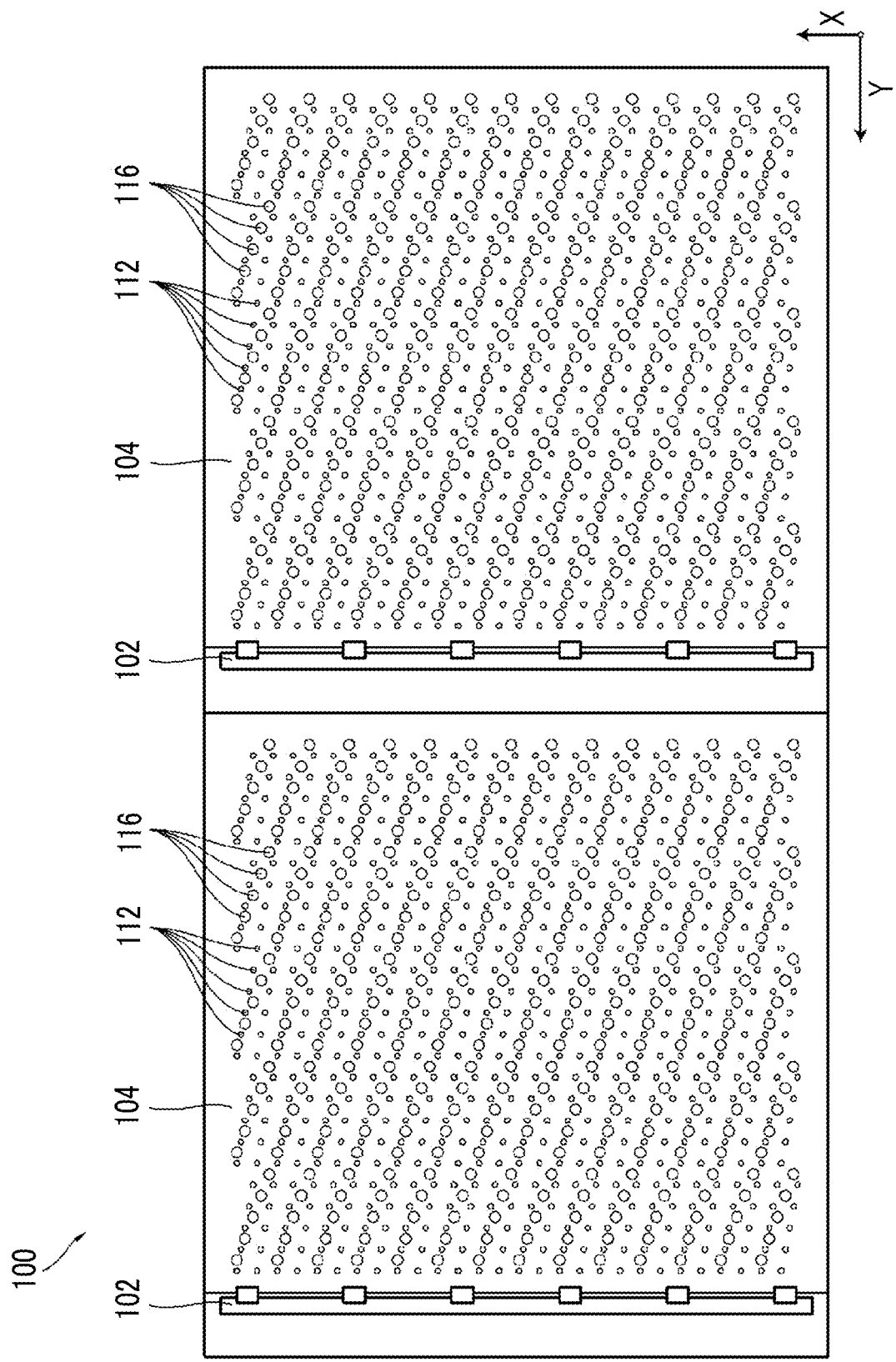

FIG. 30 is a development view of the peripheral surface of a printing drum that includes protrusions on the peripheral surface thereof.

Figure 31:
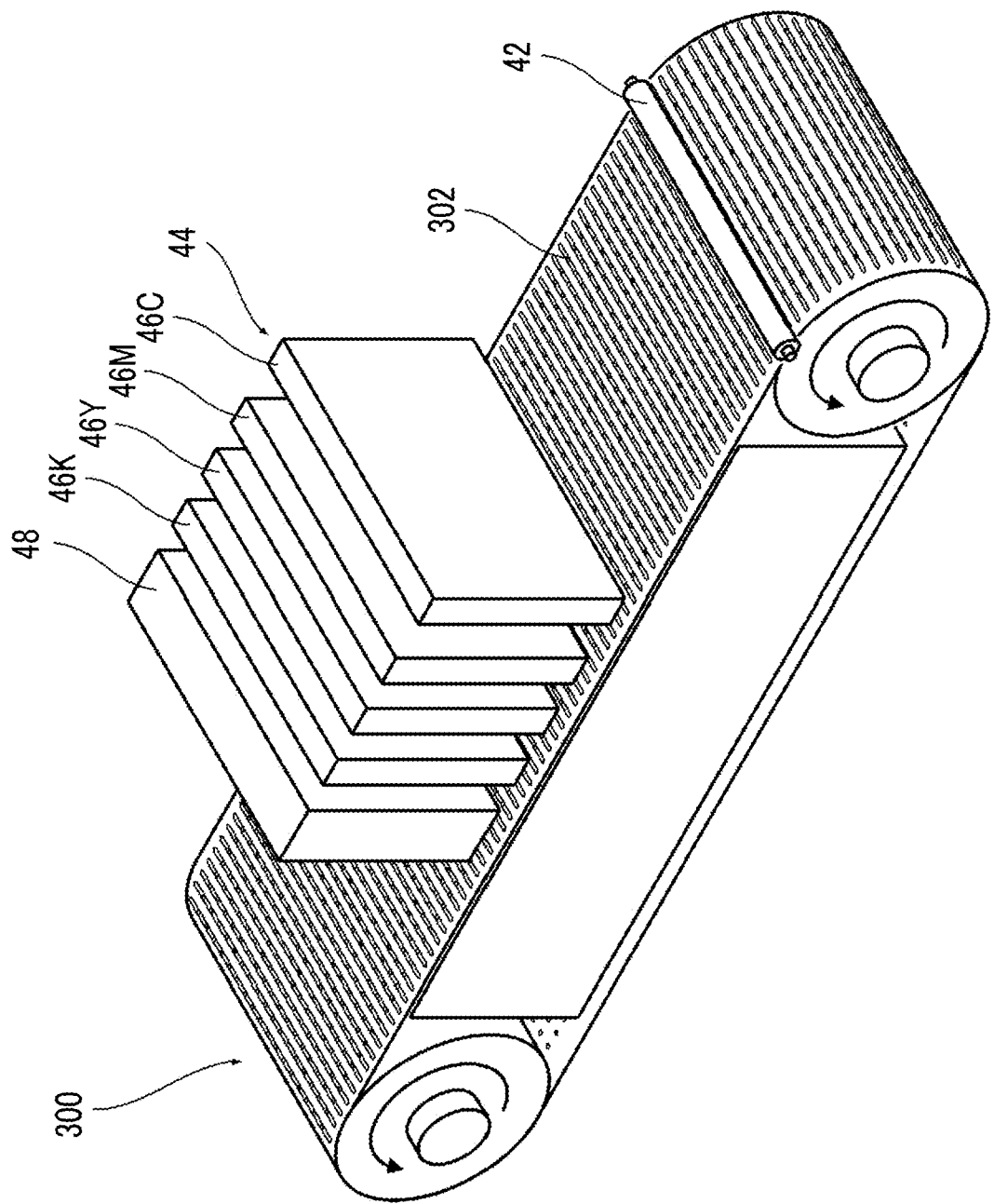

FIG. 31 is a perspective view showing another example of a transport unit.

DESCRIPTION OF THE PREFERRED EMBODIMENTS

Embodiments of the invention will be described in detail below with reference to accompanying drawings.

<<Entire Structure of Printing Apparatus>>

Figure 1:
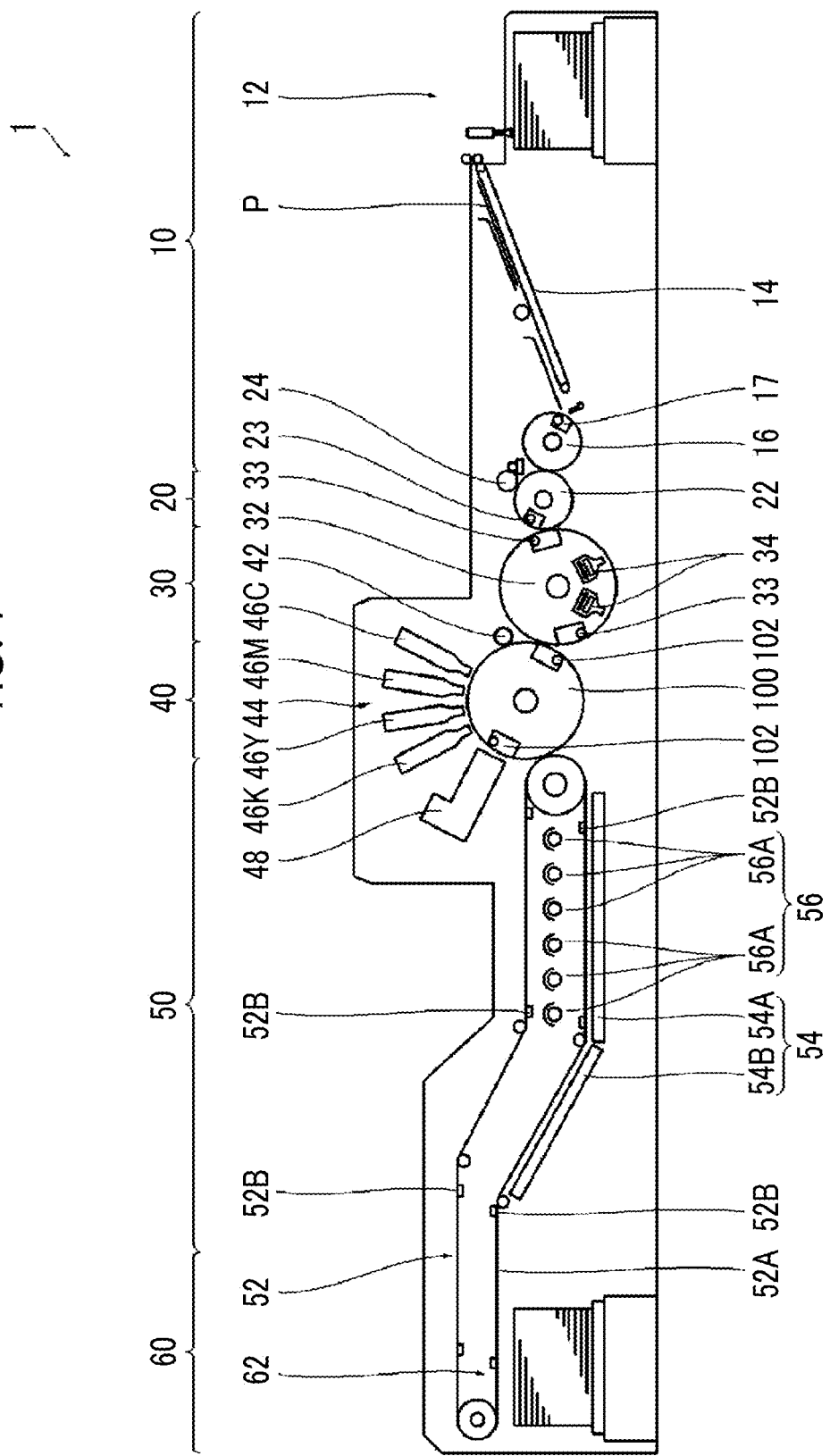
FIG. 1 is a view showing the entire structure of an embodiment of a printing apparatus.

FIG. 1 is a view showing the entire structure of an embodiment of a printing apparatus. The printing apparatus 1 is a sheet-feed type ink jet printing apparatus that prints an image on a sheet of paper (hereinafter, referred to as a sheet), which is a sheet-like medium, by an ink jet method. Particularly, the printing apparatus 1 is a sheet-feed type color ink jet printing apparatus that prints a color image on a general-purpose printing sheet by using aqueous ink.

The general-purpose printing sheet is not so-called ink jet exclusive paper and means a sheet, which uses cellulose as a main component, such as coated paper (art paper, coated paper, lightweight coated paper, cast coated paper, fine coated paper, or the like) that is used in offset printing or the like. Further, the aqueous ink means ink in which a color material, such as a dye or a pigment, is dissolved or dispersed in water and a solvent soluble in water.

As shown in FIG. 1, the printing apparatus 1 mainly includes: a sheet feeding section 10 that feeds a sheet P; a treatment liquid applying section 20 that applies predetermined treatment liquid to the sheet P fed from the sheet feeding section 10; a treatment liquid drying section 30 that performs processing for drying the sheet P to which the treatment liquid has been applied; a printing section 40 that prints an image on the sheet P, which has been subjected to drying processing, by an ink jet method; an ink drying section 50 that performs processing for drying the sheet P on which the image has been printed; and a collecting section 60 that collects the sheet P having been subjected to drying processing.

<Sheet Feeding Section>

The sheet feeding section 10 feeds sheets P one by one. As shown in FIG. 1, the sheet feeding section 10 mainly includes a sheet feeding device 12, a feeder board 14, and a sheet feed drum 16.

The sheet feeding device 12 sequentially takes out the sheets P, which are set at a predetermined position in the form of a sheet bundle, from the top of the sheet bundle one by one and feeds the sheets P to the feeder board 14 one by one.

The feeder board 14 receives the sheets P that are fed from the sheet feeding device 12 one by one, transports the received sheets P along a predetermined conveying path, and transfers the sheets P to the sheet feed drum 16.

The sheet feed drum 16 receives the sheets P fed from the feeder board 14, transports the received sheets P along a predetermined transport path, and transfers the sheets P to the treatment liquid applying section 20. The sheet feed drum 16 has a cylindrical shape, and grips a front end portion of the sheet P in a transport direction by a gripper 17, which is provided on the peripheral surface of the sheet feed drum 16, and rotates. Accordingly, the sheet feed drum 16 transports the sheet P while winding the sheet P around the peripheral surface thereof.

<Treatment Liquid Applying Section>

The treatment liquid applying section 20 applies predetermined treatment liquid to the printing surface of the sheet P. The treatment liquid, which is applied by the treatment liquid applying section 20, is liquid having a function to allow a color material component, which is contained in ink, to aggregate, to insolubilize the color material component, or to thicken the color material component. Since the treatment liquid is applied to the sheet, a high-quality image can be printed even in a case in which an image is printed on a general-purpose printing sheet by an ink jet method.

As shown in FIG. 1, the treatment liquid applying section 20 mainly includes a treatment liquid applying drum 22 that transports a sheet P, and a treatment liquid applying device 24 that applies treatment liquid to the printing surface of the sheet P transported by the treatment liquid applying drum 22.

The treatment liquid applying drum 22 receives the sheet P from the sheet feed drum 16 of the sheet feeding section 10, transports the received sheet P along a predetermined transport path, and transfers the sheet P to the treatment liquid drying section 30. The treatment liquid applying drum 22 has a cylindrical shape, and grips a front end portion of the sheet P in a transport direction by a gripper 23, which is provided on the peripheral surface of the treatment liquid applying drum 22, and rotates. Accordingly, the treatment liquid applying drum 22 transports the sheet P while winding the sheet P around the peripheral surface thereof. The sheet P is transported while being wound around the peripheral surface of the treatment liquid applying drum 22 in a state in which the printing surface of the sheet P faces the outside.

The treatment liquid applying device 24 applies treatment liquid to the surface of the sheet P that is transported by the treatment liquid applying drum 22. In this embodiment, treatment liquid is applied by a roller. That is, a roller to which treatment liquid has been applied to the peripheral surface thereof is pressed against the printing surface of the sheet P transported by the treatment liquid applying drum 22, so that the treatment liquid is applied to the sheet. A method of applying treatment liquid is not limited thereto, and a method of applying treatment liquid by using an ink jet head, a method of applying treatment liquid by using a spray, and the like can also be employed besides the above-mentioned method.

The treatment liquid applying section 20 has the above-mentioned structure. While a sheet P is transported by the treatment liquid applying drum 22, treatment liquid is applied to the printing surface of the sheet P by the treatment liquid applying device 24.

<Treatment Liquid Drying Section>

The treatment liquid drying section 30 performs processing for drying the sheets P to which treatment liquid has been applied. The treatment liquid drying section 30 mainly includes a treatment liquid drying drum 32 that transports sheets P, and treatment liquid drying devices 34 that dry the sheets P by blowing hot air to the sheets P transported by the treatment liquid drying drum 32.

The treatment liquid drying drum 32 receives a sheet P from the treatment liquid applying drum 22 of the treatment liquid applying section 20, transports the received sheet P along a predetermined transport path, and transfers the sheet P to the printing section 40. The treatment liquid drying drum 32 is formed of a frame body formed in a cylindrical shape, and grips front end portions of the sheets P in a transport direction by grippers 33, which are provided on the peripheral surface of the treatment liquid drying drum 32, and rotates. Accordingly, the treatment liquid drying drum 32 transports the sheets P.

The treatment liquid drying devices 34 are installed in the treatment liquid drying drum 32, and send hot air to the sheets P transported by the treatment liquid drying drum 32.

The treatment liquid drying section 30 has the above-mentioned structure. While sheets P are transported by the treatment liquid drying drum 32, hot air sent from the treatment liquid drying devices 34 is blown to the surfaces of the sheets to which treatment liquid has been applied and the sheets are subjected to drying processing.

<Printing Section>

The printing section 40 prints a color image on the printing surface of the sheet P with ink having four colors of cyan (C), magenta (M), yellow (Y), and black (K).

Figure 2:
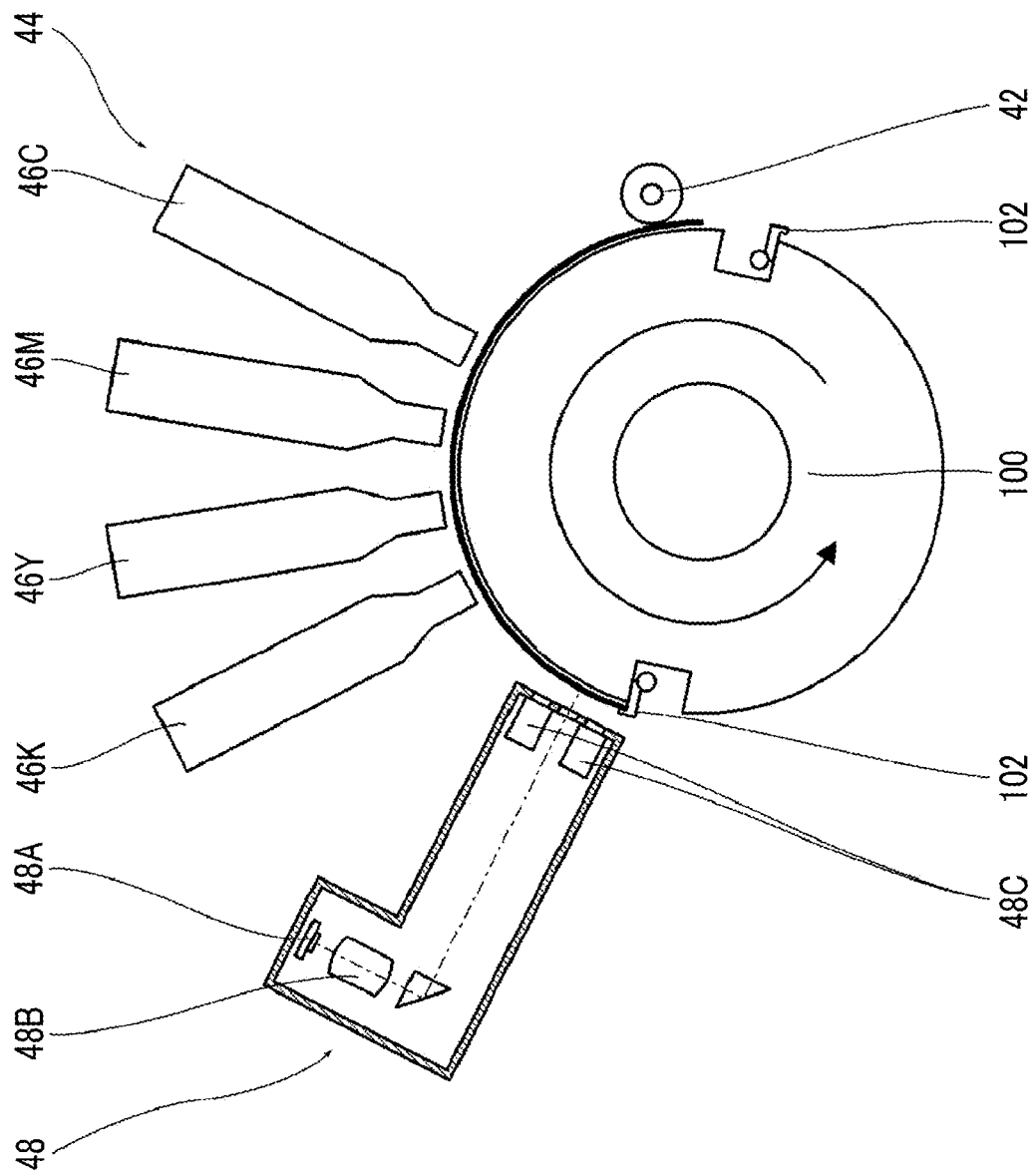
FIG. 2 is a view showing the schematic structure of a printing section.

FIG. 2 is a view showing the schematic structure of the printing section. As shown in FIG. 2, the printing section 40 mainly includes: a printing drum 100 that transports sheets P; a pressing roller 42 that makes each sheet P come into close contact with the peripheral surface of the printing drum 100 by pressing each sheet P, which is transported by the printing drum 100, against the peripheral surface of the printing drum 100; a head unit 44 that discharges ink droplets having colors of C, M, Y, and K to the sheet P transported by the printing drum 100; and a scanner 48 that reads the image printed on the sheet P.

The printing drum 100 is an example of a transport unit. The printing drum 100 receives the sheets P from the treatment liquid drying drum 32 of the treatment liquid drying section 30, transports the received sheets P along a predetermined transport path, and transfers the sheets P to the ink drying section 50. The printing drum 100 has a cylindrical shape, grips ends of the sheets P by grippers 102, which are provided on the peripheral surface of the printing drum 100, and rotates. Accordingly, the printing drum 100 transports the sheets P while winding the sheets P around the peripheral surface thereof that is a medium holding surface. The printing drum 100 is provided with a suction mechanism to make the sheets P come into close contact with the peripheral surface of the drum. That is, the printing drum 100 is adapted to be capable of transporting the sheets P while sucking the sheets P on the peripheral surface 104 that is the medium holding surface. In the printing drum 100 of this embodiment, a sheet P is sucked using negative pressure. The printing drum 100 includes a plurality of suction holes on the peripheral surface thereof that is the medium holding surface, and sucks the sheets P on the peripheral surface thereof by sucking air from the inside of the drum through the suction holes. The structure of the printing drum 100 will be described in more detail below.

The pressing roller 42 makes the sheet P come into close contact with the peripheral surface of the printing drum 100 while the sheet P is interposed between the pressing roller 42 and the printing drum 100. The pressing roller 42 is positioned immediately behind a position where the printing drum 100 receives the sheet P from the treatment liquid drying drum 32. Accordingly, while the sheet P is pressed by the pressing roller 42, the sheet P is wound around the peripheral surface of the printing drum 100.

The head unit 44 is a printing unit in a broad sense; and includes an ink jet head 46C that discharges cyan ink droplets, an ink jet head 46M that discharges magenta ink droplets, an ink jet head 46Y that discharges yellow ink droplets, and an ink jet head 46K that discharges black ink droplets. The respective ink jet heads 46C, 46M, 46Y, and 46K are disposed on the transport path of the sheet P transported by the printing drum 100.

Each of the ink jet heads 46C, 46M, 46Y, and 46K is a printing unit in a narrow sense. Each of the ink jet heads 46C, 46M, 46Y, and 46K is formed of a line head so as to be capable of printing an image on the sheet P, which is transported by the printing drum 100, through a single pass. Each of the ink jet heads 46C, 46M, 46Y, and 46K includes a nozzle surface at the tip thereof, and discharges ink droplets to the sheet P, which is transported by the printing drum 100, from nozzles disposed on the nozzle surface.

Figure 3:
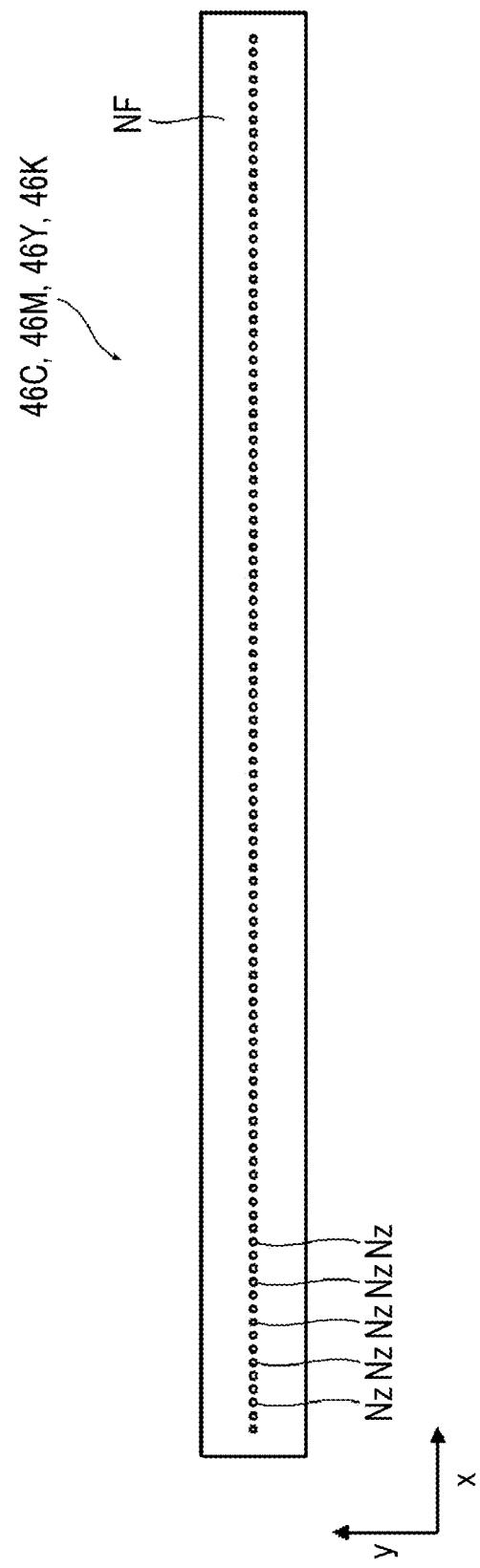
FIG. 3 is a plan view of a nozzle surface.

FIG. 3 is a plan view of the nozzle surface.

As shown in FIG. 3, nozzles Nz are arranged at a constant pitch along a direction x, which is orthogonal to a transport direction y of a sheet P, on the nozzle surface NF of each of the ink jet heads 46C, 46M, 46Y, and 46K.

As shown in FIG. 2, the scanner 48, which is an image reading unit, is installed on the downstream side of the head unit 44 in the transport direction of the sheet P that is transported by the printing drum 100. The scanner 48 is adapted to be capable of reading an image from the sheet P transported by the printing drum 100.

As shown in FIG. 2, the scanner 48 mainly includes an imaging element 48A serving as an imaging unit, an optical system 48B, and an illumination lamp 48C serving as an illumination unit.

The imaging element 48A is formed of a linear image sensor that can image the entire area of a sheet P in a width direction of the sheet P. The imaging element 48A reads an image, which is printed on the entire area of the sheet in a main scanning direction, in the shape of a line so that a direction orthogonal to the transport direction of the sheet P serves as the main scanning direction.

The optical system 48B forms an optical image, which is formed on the surface of the sheet P transported by the printing drum 100, on the light receiving surface of the imaging element 48A.

The illumination lamp 48C irradiates the sheet P, which is transported by the printing drum 100, with illumination light. The illumination lamp 48C is formed of, for example, a line illumination, and irradiates a portion, which is read by the imaging element 48A, with illumination light.

In the printing apparatus 1 of this embodiment, the printing drum 100, which is the transport unit, and the scanner 48, which is the image reading unit, form an image reading device.

The printing section 40 has the above-mentioned structure. While a sheet P is transported by the printing drum 100, ink droplets having the respective colors of C, M, Y, and K are ejected to the printing surface of the sheet P from the respective ink jet heads 46C, 46M, 46Y, and 46K of the head unit 44. As a result, a color image is printed on the printing surface of the sheet P. The image printed on the sheet P is read by the scanner 48 as necessary.

<Ink Drying Section>

The ink drying section 50 performs processing for drying the sheet P on which the image has just been printed by the printing section 40. As shown in FIG. 1, the ink drying section 50 mainly includes a chain gripper 52 that transports a sheet P, a sheet guide 54 that guides the travel of the sheet P transported by the chain gripper 52, and a heating-drying device 56 that dries the printing surface of the sheet P, which is transported by the chain gripper 52, by heating the printing surface of the sheet P.

The chain gripper 52 receives the sheet P from the printing drum 100 of the printing section 40, transports the received sheet P along a predetermined transport path, and transfers the sheet P to the collecting section 60. The chain gripper 52 includes an endless chain 52A that travels along a fixed travel path, grips an end of the sheet P by grippers 52B provided on the chain 52A, and transports the sheet P. Since the sheet P is transported by the chain gripper 52, the sheet P passes through a heating area and a non-heating area set in the ink drying section 50 and is transferred to the collecting section 60. The heating area is set to an area in which the sheet P transferred from the printing section 40 is horizontally transported for the first time, and the non-heating area is set to an area in which the sheet P is transported obliquely.

The sheet guide 54 is disposed along the transport path of the sheet P that is transported by the chain gripper 52, and guides the travel of the sheet P that is transported by the chain gripper 52. The sheet guide 54 includes a first guide board 54A and a second guide board 54B.

The first guide board 54A is a guide board that is disposed in the heating area, and has the shape of a hollow flat plate. The upper surface portion of the first guide board 54A serves as the guide surface for the sheet P, and the sheet P is transported while sliding on the guide surface.

The guide surface of the first guide board 54A is provided with a plurality of suction holes. Since the first guide board 54A sucks air from the inside thereof through the suction holes by negative pressure, the first guide board 54A guides the travel of the sheet P while sucking the sheet P on the guide surface.

Further, the first guide board 54A is provided with a cooling mechanism that cools the guide surface. The cooling mechanism is formed of, for example, a water-cooled cooling mechanism, and cools the guide surface by allowing cooling liquid to flow in a flow passage provided therein. The temperature of the guide surface of the first guide board 54A is controlled to a constant temperature by the cooling mechanism.

The second guide board 54B is a guide board that is disposed in the non-heating area. The structure of the second guide board 54B is the same as the structure of the first guide board 54A. That is, the second guide board 54B has the shape of a hollow flat plate, and guides the travel of the sheet P while sucking the sheet P on the guide surface. Furthermore, the second guide board 54B is provided with a cooling mechanism, and the temperature of the guide surface of the second guide board 54B is controlled to a constant temperature.

The heating-drying device 56 is installed in the heating area, and dries the printing surface of the sheet P, which is being transported in the heating area, by heating the printing surface of the sheet P with radiant heat that is emitted from a heat source. The heating-drying device 56 includes a plurality of infrared lamps 56A serving as heat sources, and is disposed inside the chain gripper 52. The infrared lamps 56A are disposed in the heating area at regular intervals along the transport path of the sheet P.

The ink drying section 50 has the above-mentioned structure. While a sheet P is transported by the chain gripper 52, the printing surface of the sheet P is heated by the heating-drying device 56 and the sheet is subjected to drying processing.

<Collecting Section>

The collecting section 60 collects sheets P, which are sequentially discharged, in one place. As shown in FIG. 1, the collecting section 60 mainly includes a collecting device 62 that receives and collects sheets P transported from the ink drying section 50 by the chain gripper 52.

The chain gripper 52 releases sheets P at a predetermined collection position. The collecting device 62 recovers the released sheets P and collects the released sheets P in the form of a bundle.

<<Control System>>

Figure 4:
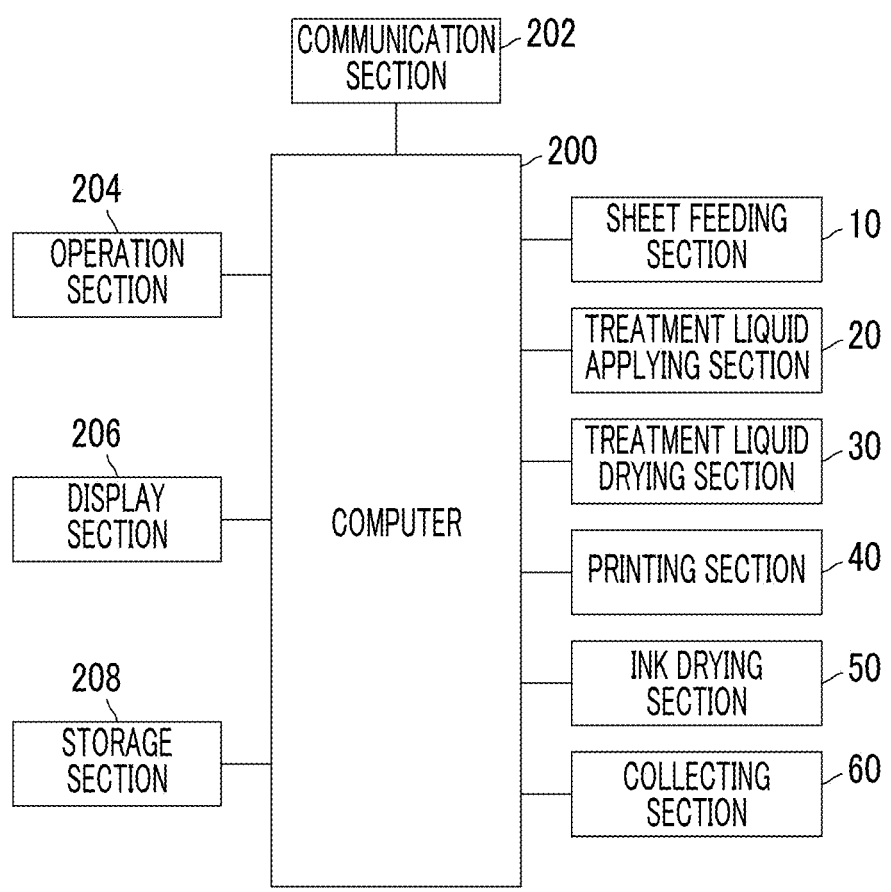
FIG. 4 is a block diagram showing the system configuration of a control system of the printing apparatus.

FIG. 4 is a block diagram showing the system configuration of a control system of the printing apparatus.

As shown in FIG. 4, the printing apparatus 1 includes a computer 200 as a control section. All operations of the printing apparatus 1 are controlled by the computer 200. That is, all kinds of processing, such as the feeding of a sheet from the sheet feeding section 10, the transport of the fed sheet P, the application of treatment liquid at the treatment liquid applying section 20, drying at the treatment liquid drying section 30, printing at the printing section 40, the reading of a printed image, drying at the ink drying section 50, and collecting at the collecting section 60, are performed under the control performed by the computer 200.

The computer 200 functions as a control section that controls each section of the printing apparatus 1 by executing a predetermined control program.

A communication section 202 that communicates with an external device, an operation section 204 that is used to operate the printing apparatus 1, a display section 206 that is used to display various kinds of information, a storage section 208 that stores various kinds of data, and the like are connected to the computer 200.

The operation section 204 can be formed of, for example, operation buttons or a keyboard, a mouse, a touch panel, or the like. The display section 206 can be formed of, for example, a display device, such as a liquid crystal display. The storage section 208 can be formed of, for example, a storage device, such as a hard disk drive. The control program executed by the computer 200, various kinds of data required for control, and the like are stored in the storage section 208.

The computer 200 acquires image data, which are to be printed, from an external device through the communication section 202. The computer 200 generates dot data by performing required signal processing on the acquired image data. The dot data are generated by generally performing color conversion processing and halftone processing on the image data. The color conversion processing is processing for converting image data (for example, RGB 8-bit image data), which are expressed by sRGB (standard RGB) and the like, into data about the amount of ink having the respective colors used in the printing apparatus 1 (in this embodiment, processing for converting image data into data about the amount of ink having the respective colors of C, M, Y, and K). The halftone processing is processing for converting the data about the amount of ink having the respective colors, which are generated by the color conversion processing, into dot data corresponding to the respective colors by processing, such as error diffusion. The computer 200 generates dot data corresponding to the respective colors by performing the color conversion processing and the halftone processing on image data. Then, the computer 200 records an image, which is represented by the image data, on a sheet P by controlling the driving of the corresponding ink jet heads according to the generated dot data corresponding to the respective colors.

<<Detection of Density Unevenness>>

The computer 200 functions as a density unevenness detecting section 210 by executing a predetermined program.

Figure 5:
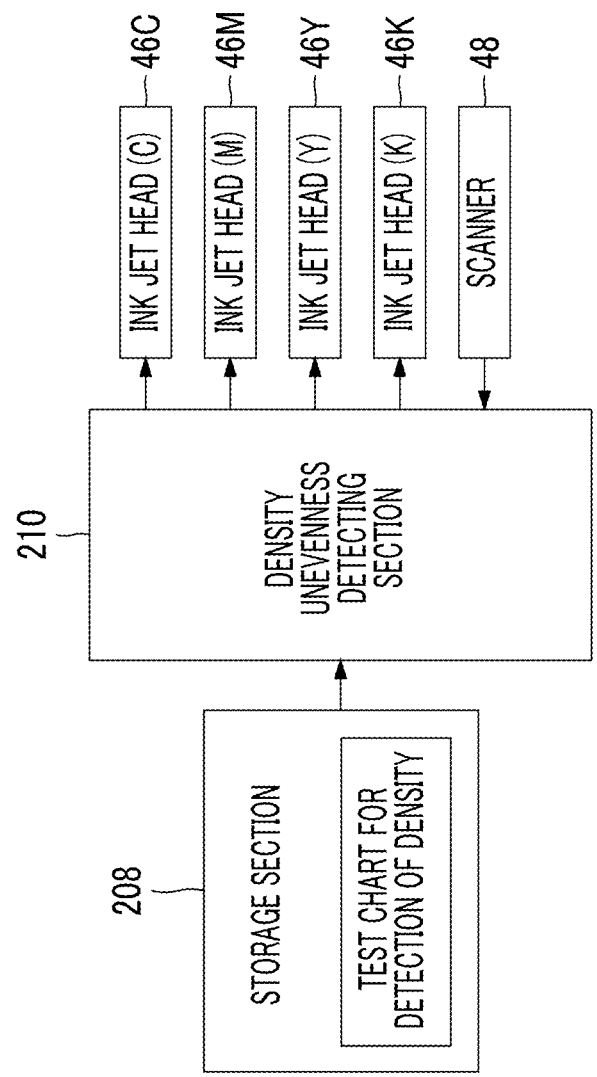
FIG. 5 is a block diagram showing the system configuration of a density unevenness detecting section.

FIG. 5 is a block diagram showing the system configuration of the density unevenness detecting section.

The density unevenness detecting section 210 allows the ink jet heads 46C, 46M, 46Y, and 46K to print a test chart for the detection of density, and allows the scanner 48 to read the results of the printing. Then, the density unevenness detecting section 210 acquires the image data of the test chart for the detection of density, which is read by the scanner 48, as inspection image data and detects the presence/absence of density unevenness on the basis of the acquired inspection image data.

The test chart for the detection of density is stored in the storage section 208, and the density unevenness detecting section 210 acquires the data of the test chart for the detection of density from the storage section 208 and allows the ink jet heads 46C, 46M, 46Y, and 46K to print the test chart for the detection of density.

The density unevenness detecting section 210 converts the resolution of the inspection image data that are acquired from the scanner 48, and acquires a density detection value corresponding to each nozzle on the basis of the inspection image data of which the resolution has been converted.

The conversion of resolution is processing for fitting the reading resolution of the imaging element 48A to the recording resolution of each of the ink jet heads 46C, 46M, 46Y, and 46K. For example, if the reading resolution of the imaging element 48A is 500 dpi and the recording resolution of each of the ink jet heads 46C, 46M, 46Y, and 46K is 1200 dpi, the density unevenness detecting section 210 converts inspection image data having a resolution of 500 dpi into inspection image data having a resolution of 1200 dpi. dpi is an abbreviation of "dots per inch" and is the unit of dot density. dpi means how many dots can be positioned within a width of 1 inch.

Here, the density detection value corresponding to each nozzle is acquired as the brightness value of the printed test chart for the detection of density.

Figure 6:
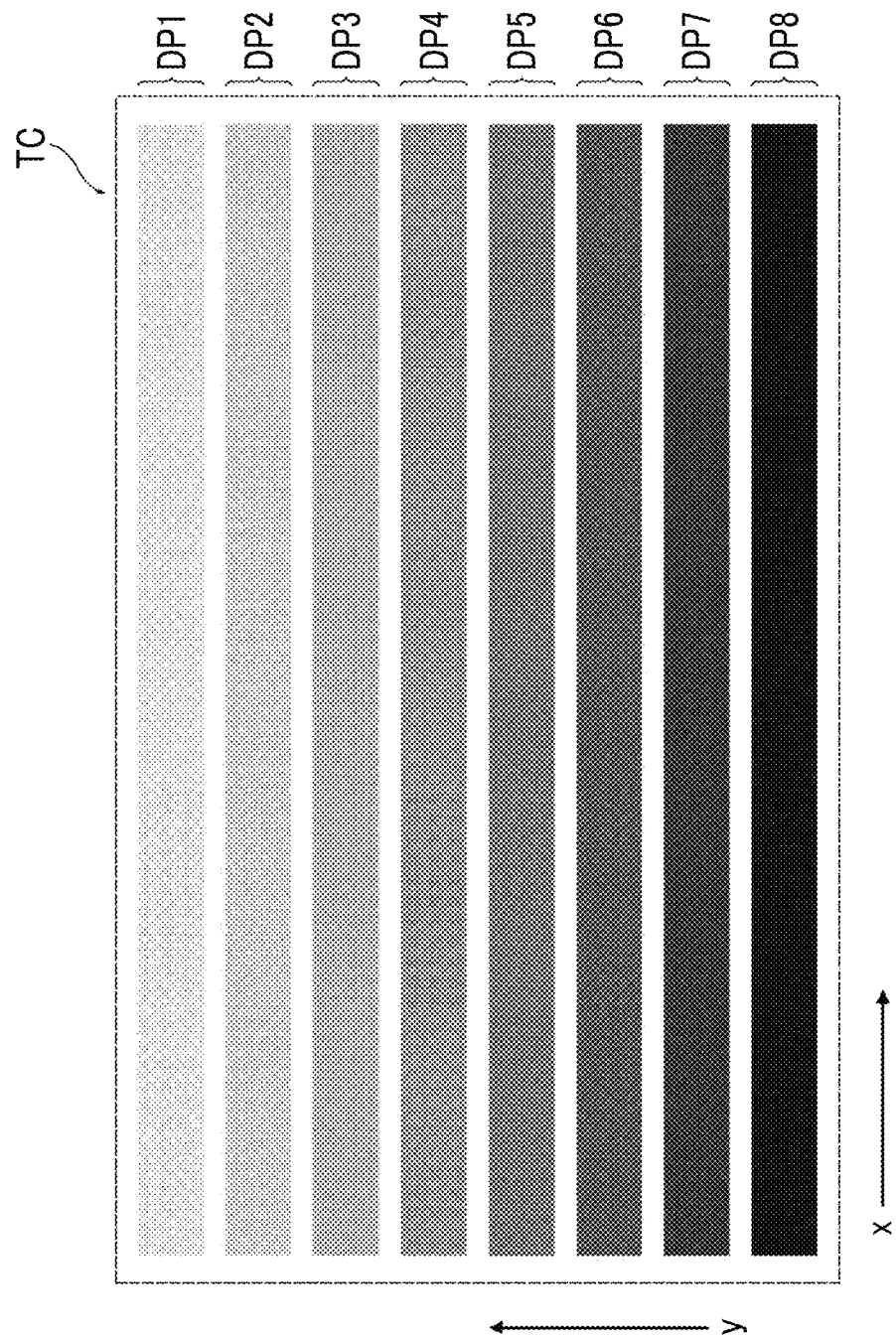
FIG. 6 is a view showing one example of a test chart for the detection of density.

FIG. 6 is a view showing one example of the test chart for the detection of density.

The test chart TC for the detection of density has a structure in which strip-shaped density patches DP1 to DP8 each of which has constant density are arranged at regular intervals in the transport direction y. The respective density patches DP1 to DP8 have different densities, and the different densities are set to increase in stages toward the rear side from the front side in the transport direction y.

Density is detected for each density patch. The density of each density patch is acquired as an average value of density in the transport direction y.

The density detection value is detected as a brightness value as described above. Further, the density detection value of each density patch corresponding to each nozzle is acquired as an average value of brightness. Since the density detection value is detected as a brightness value, density becomes high as the numerical value of a density detection value is reduced.

FIGS. 7A and 7B are graphs showing the detection results of the densities of the density patches. FIG. 7A shows the detection results of density in a case in which a printed density patch DPx does not have density unevenness, and FIG. 7B shows the detection results of density in a case in which a printed density patch DPx has density unevenness.

In a case in which the printed density patch DPx does not have density unevenness, the detected density detection value (brightness value) corresponding to each nozzle is constant as shown in FIG. 7A.

In a case in which the printed density patch DPx has density unevenness, the density detection value (brightness value) of a portion corresponding to a nozzle in which density unevenness is generated is changed as shown in FIG. 7.

In this way, the presence/absence of density unevenness can be detected from the presence/absence of a change in the density detection value. Further, in a case in which density unevenness is present, the position of the density unevenness can be specified.

In a case in which density unevenness is detected, the computer 200 corrects the density unevenness as necessary. Alternatively, the computer 200 performs maintenance.

<<Flow of Printing Processing>>

Processing for printing an image is performed in the order of (a) the feeding of a sheet, (b) the applying of treatment liquid, (c) drying, (d) the printing of an image, (e) drying, and (f) collecting.

When the start of the printing of an image is instructed, a sheet starts to be fed from the sheet feeding section 10. First, the sheet P, which is fed from the sheet feeding section 10, is transported to the treatment liquid applying section 20. Then, while the sheet P is transported by the treatment liquid applying drum 22 of the treatment liquid applying section 20, treatment liquid is applied to the printing surface of the sheet P.

Next, the sheet P to which treatment liquid has been applied is transported to the treatment liquid drying section 30. Then, while the sheet P is transported by the treatment liquid drying drum 32 of the treatment liquid drying section 30, hot air is blown to the printing surface of the sheet P and the sheet P is subjected to drying processing.

Next, the sheet P, which has been subjected to drying processing, is transported to the printing section 40. Then, while the sheet P is transported by the printing drum 100 of the printing section 40, ink droplets having the respective colors of cyan, magenta, yellow, and black are ejected and a color image is printed on the printing surface of the sheet P.

Next, the sheet P on which the image has been printed is transported to the ink drying section 50. Then, while the sheet P is transported by the chain gripper 52 of the ink drying section 50, heat emitted from the infrared lamps 56A is applied to the printing surface of the sheet P and the sheet P is subjected to drying processing.

The sheet P, which has been subjected to drying processing, is transported to the collecting section 60 by the chain gripper 52 just as it is, and is recovered by the collecting device 62 of the collecting section 60.

<<Printing Drum>>

Since the printing apparatus 1 of this embodiment includes the image reading device as described above, the printing apparatus 1 can detect density unevenness in an in-line manner. The test chart TC for the detection of density is printed by the ink jet heads 46C, 46M, 46Y, and 46K and the image of the printed test chart TC for the detection of density is read by the scanner 48, so that the detection of density unevenness is performed.

The scanner 48 includes the printing section 40, and performs the reading of the test chart TC for the detection of density on the printing drum 100. The peripheral surface, which is the medium holding surface, of the printing drum 100 is provided with suction holes 112 that are used to suck the sheet P.

When the printing drum 100 is provided with the suction holes 112, the shadows of the suction holes 112 are seen in a case in which the printing drum 100 sucks a thin sheet P. For this reason, a case in which density is detected is adversely affected.

Figure 8A:
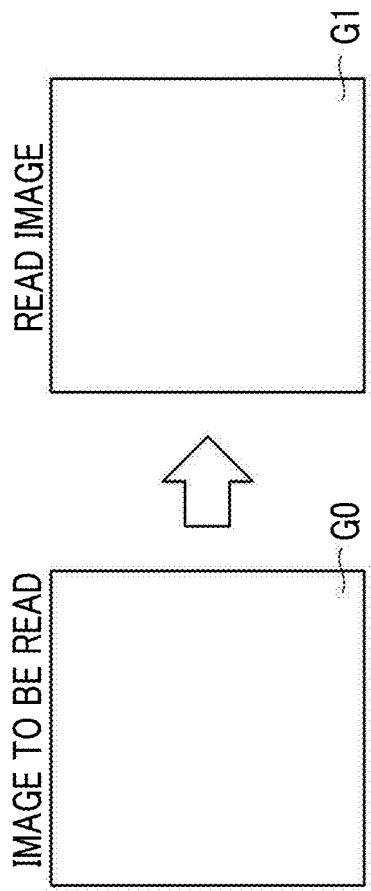
FIGS. 8A and 8B are views illustrating a difference in a read image that is caused by the presence/absence of a suction hole.
Figure 8B:
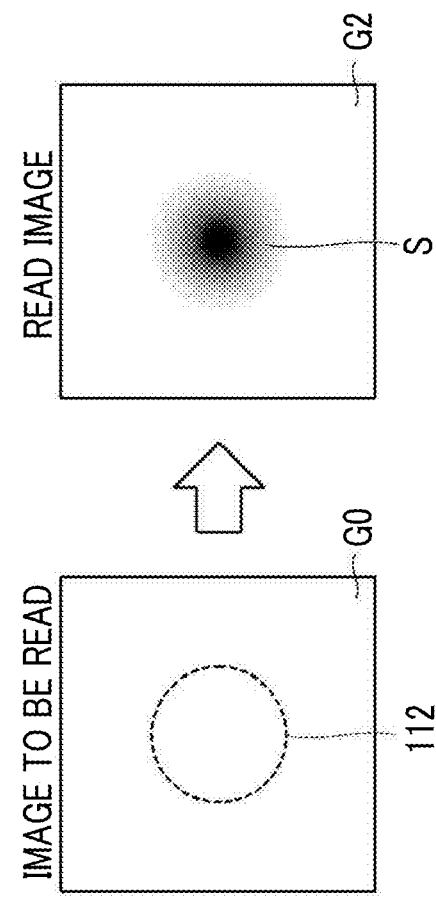

FIGS. 8A and 8B are views showing a difference in a read image that is caused by the presence/absence of a suction hole. FIG. 8A shows a case in which an image G0 having a uniform density is read at a position where the suction hole is not present. Further, FIG. 8B shows a case in which an image G0 having a uniform density is read at a position where the suction hole is present.

When the image G0 having a uniform density is read in an area where a suction hole is not present, an image G1 having a uniform density is obtained as shown in FIG. 8A.

Since the shadow S of the suction hole 112 is seen in an area where a suction hole is present as shown in FIG. 8B even though the density of the image G0 to be read is uniform, an image G2 of which the density is high at a portion corresponding to the suction hole. Further, when the shadow S is seen, the detection of density unevenness is adversely affected.

(A) to (C) of FIG. 9 are views illustrating an influence of the suction holes on the detection of density unevenness. (A) of FIG. 9 shows an example of the arrangement of the suction holes. (B) of FIG. 9 shows the image of a density patch that is read by a scanner in a case in which the suction holes are arranged as shown in (A) of FIG. 9. (C) of FIG. 9 shows the detection result of density.

When the image of a density patch, which is printed on a thin sheet and has a uniform density, is read by the scanner in a case in which suction holes are arranged at a constant pitch in a vertical direction and a horizontal direction as shown in (A) of FIG. 9, the shadows SG of the suction holes are seen in a read image I so as to correspond to the positions of the suction holes as shown in (B) of FIG. 9. As a result, even in a case in which the printed density patch does not have density unevenness, a density detection value is changed at portions corresponding to the suction holes as shown in (C) of FIG. 9 and false detection occurs.

In the printing apparatus 1 of this embodiment, the printing drum 100 is formed so as to have the following structure to avoid this problem.

<<First Embodiment of Printing Drum>>

<Structure>

FIG. 10 is a perspective view showing the structure of the printing drum.

A printing drum 100 has a cylindrical shape, and transports sheets P by rotating while winding the sheets P around a peripheral surface 104 thereof that is the medium holding surface. The printing drum 100 is installed in the printing section 40 so that a shaft portion of the printing drum 100 is supported by bearings (not shown). The printing drum 100, which is installed in the printing section 40, is connected to a motor 108 serving as a driving unit. The printing drum 100 is rotated about the shaft by rotational power obtained from the motor 108.

The printing drum 100 is provided with the grippers 102 at two positions on the outer peripheral surface thereof. Ends of sheets P are gripped by the grippers 102.

The suction holes 112 and grooves 114 are regularly arranged on the peripheral surface 104 of the printing drum 100 that is the medium holding surface. The printing drum 100 sucks the sheets P on the peripheral surface 104 by sucking air from the inside thereof through the suction holes 112. The arrangement of the suction holes 112 and the grooves 114 will be described below.

A vacuum flow passage (not shown), which communicates with the suction holes 112, is provided in the printing drum 100. The vacuum flow passage is connected to a vacuum pump 110, which is installed outside the printing drum 100, through the shaft portion of the printing drum 100. When the vacuum pump 110 is driven, the printing drum 100 sucks air from the respective suction holes 112.

A suction range is limited to a fixed range. The suction range is set between the installation position of the pressing roller 42 and a position where the sheet P is delivered to the chain gripper 52. Each of the suction holes 112 is subjected to suction between the installation position of the pressing roller 42 and the position where the sheet P is delivered to the chain gripper 52.

FIG. 11 is a development view showing the structure of the peripheral surface of the printing drum. FIG. 12 is an enlarged perspective view of an area ZA that is a part of FIG. 11. FIG. 13 is an enlarged view of the area ZA that is a part of FIG. 11. FIG. 14 is a cross-sectional view taken along line 14-14 of FIG. 13. FIG. 15 is a cross-sectional view taken along line 15-15 of FIG. 13.

As described above, the peripheral surface 104 of the printing drum 100 is provided with the suction holes 112 and the grooves 114.

Each of the suction holes 112 has a circular shape. The suction holes 112 are arranged at a first interval pt1 in the transport direction y of a sheet P, and are arranged at a second interval pt2 in a direction x orthogonal to the transport direction of the sheet P.

The grooves 114 are arranged along the direction x orthogonal to the transport direction y of the sheet P. Further, the grooves 114 are arranged at the same interval as the interval between the suction holes 112 in the transport direction y of the sheet P. That is, the grooves 114 are arranged at the first interval pt1.

Here, when the length of the sheet P in the transport direction y is referred to as a longitudinal width and the length of the sheet P in the direction x orthogonal to the transport direction y is referred to as a lateral width, the grooves 114 are arranged so as to have a length that is equal to or longer than the lateral width of the sheet P. For this reason, the grooves 114 are arranged so as to cross a holding area HA for the sheet P in the direction x orthogonal to the transport direction y. The holding area HA for the sheet P is an area that is shown in FIG. 11 by a broken line, and is an area, which holds the sheet P, of the peripheral surface 104 of the printing drum 100. In other words, an area with which the sheet P comes into close contact when being transported is the holding area for the sheet P on the peripheral surface 104. The grooves 114 are arranged so as to cross the holding area in the direction x orthogonal to the transport direction.

As described above, the grooves 114 are arranged at the same interval as the interval between the suction holes 112 in the transport direction y. That is, the grooves 114 are arranged at the first interval pt1. Accordingly, the suction holes 112 and the grooves 114 are arranged at the same positions in the transport direction y.

Each groove 114 has a width w that is equal to the diameter d of each suction hole 112, and the suction holes 112 are arranged in each groove 114. That is, all the suction holes 112, which are arranged in the direction x orthogonal to the transport direction, are arranged so as to be housed in one groove 114. The groove 114 has a role to connect the suction holes 112, which are arranged in the direction x orthogonal to the transport direction, in a linear shape.

[Action]

(A) to (C) of FIG. 16 are views illustrating the action of the printing drum of this embodiment. (A) of FIG. 16 shows a part of the peripheral surface of the printing drum of this embodiment. (B) of FIG. 16 shows the read image of a density patch that is read by the scanner in a case in which the printing drum of this embodiment is used. (C) of FIG. 16 shows the detection result of density.

As shown in (A) of FIG. 16, all the suction holes 112, which are arranged on the peripheral surface 104 of the printing drum 100 of this embodiment, are arranged in the grooves 114.

For this reason, when the image of a density patch printed at a uniform density is read by the scanner, the shadows SG of the grooves 114 are seen in a read image I as shown in (B) of FIG. 16.

However, since the grooves 114 are uniformly formed in the holding area for the sheet P in the direction x orthogonal to the transport direction of the sheet P, uniform density is obtained over the entire area of the sheet P in the width direction of the sheet P at the positions where the grooves 114 are arranged. Here, the width direction of the sheet P is a direction that is orthogonal to the transport direction of the sheet P and is parallel to the medium holding surface. This direction is the main scanning direction for the reading performed by the scanner 48.

As a result, the density detection value (brightness value) of the density patch printed at a uniform density is constant over the entire area of the sheet P in the width direction as shown in (C) of FIG. 16. That is, since the density of the density patch is acquired as an average value of density in the transport direction y, the density acquired as an average value is constant over the entire area of the sheet P in the width direction if shadows SG uniformly appear over the entire area of the sheet P in the width direction even though the shadows SG are seen.

(A) to (C) of FIG. 17 are views illustrating the detection results of density that are obtained when a density patch having density unevenness is read. (A) of FIG. 17 shows the image of the density patch having density unevenness. (B) of FIG. 17 shows a read image that is obtained in a case in which the density patch having density unevenness is read by the scanner. (C) of FIG. 17 shows the detection result of density.

When a sheet on which an image I1 of a density patch having density unevenness as shown in (A) of FIG. 17 is printed is read by the scanner, the shadows SG of the grooves 114 are seen in a read image i1 together with the density unevenness as shown in (B) of FIG. 17.

However, when the density of each area is taken as an average value in the transport direction y, density components caused by the shadows SG of the grooves 114 are offset as a whole. As a result, only the density detection value (brightness value) of a portion at which density unevenness is actually generated is changed as shown in (C) of FIG. 17. Accordingly, it is possible to detect the presence/absence of density unevenness and a portion at which density unevenness is generated by detecting the portion of which the density detection value is changed.

According to the printing drum 100 of this embodiment, it is possible to accurately detect density unevenness without the influence of the suction holes 112 even in a case in which a sheet P is sucked using air pressure in this way.

<Selection of Suction Holes and Grooves>

As described above, the grooves 114 are formed so that the value of density, which is acquired as an average value of brightness in the transport direction, is made constant over the entire area of the sheet P in the width direction. Accordingly, the depth h and the width w of the groove 114 are determined in terms of the achievement of the constant value of density over the entire area of the sheet P in the width direction.

Specifically, the depth h and the width w of the groove 114 are set in consideration of items, which affect a shadow, such as the brightness of the illumination lamp and the resolution and sensitivity of the imaging element. For example, the grooves are formed so as to satisfy a condition where a sheet serving as a reference, that is, a sheet that has constant translucency over the entire area of the sheet in a width direction of the sheet and constant reflectivity is transported, an image printed the sheet is read by the scanner 48, and an integrated value of brightness in the transport direction, which is obtained from the read image, is constant over the entire area of the sheet P in the width direction. The width w and the depth h are selected so as to satisfy a condition where the integrated value of brightness in the transport direction is constant over the entire area of the sheet P in the width direction, and the grooves are formed. Accordingly, the grooves 114, which are formed on the peripheral surface of the printing drum 100, can be optimized. Here, the width direction of the sheet is a direction that is orthogonal to the transport direction of the sheet.

It is preferable that a sheet, which is actually printed by the printing apparatus, is selected as the sheet serving as a reference. In a case in which a plurality of these sheets are present, it is preferable that a sheet having the highest translucency among the sheets is selected as the sheet serving as a reference.

If the grooves 114 are too shallow, a difference in brightness is caused between the suction holes 112. On the other hand, if the grooves 114 are too deep, there is a concern that deformation, such as wrinkles, may be caused on the sheet P. Accordingly, it is preferable that the grooves 114 are formed as shallowly as possible in a range in which a difference in brightness is not caused between the suction holes 112.

For example, the width of the groove 114 can be set to be equal to the diameter of the suction hole 112 and the depth of the groove 114 can be set in the range of 50 µm to 300 µm. The diameter of the suction hole 112 can be set to, for example, 0.8 mm.

MODIFICATION EXAMPLES

Modification Example (1)

FIG. 18 is a view showing Modification example (1) of the arrangement of the suction holes and the grooves.

The suction holes 112 have been arranged at the first interval pt1 in the transport direction y of a sheet P and have been arranged at the second interval pt2 in the direction x orthogonal to the transport direction of the sheet P in the above-mentioned embodiment, but the arrangement of the suction holes 112 is not limited thereto.

As shown in FIG. 18, the positions of the suction holes 112, which are arranged in the transport direction y of a sheet P, can also be arranged so as to alternately shift from each other. In the example shown in FIG. 18, the positions of the suction holes 112, which are arranged in the transport direction y of a sheet P, are arranged so as to shift from each other by a half of the pitch. This arrangement is referred to as so-called zigzag arrangement. Even in this case, all the suction holes 112, which are arranged in a direction orthogonal to the transport direction, are connected to each other by one groove 114. Accordingly, the value of density, which is acquired as an average value of brightness in the transport direction, can be made constant over the entire area of the sheet P in the width direction.

Modification Example (2)

FIG. 19 is a view showing Modification example (2) of the arrangement of the suction holes and the grooves.

The suction holes 112, which are arranged in the direction x orthogonal to the transport direction, have been connected to each other by one groove 114 in the above-mentioned embodiment, but the grooves 114 not including the suction holes 112 can also be arranged on the peripheral surface 104 of the printing drum 100. However, even in this case, the grooves 114 are required to be arranged so as to cross the holding area HA for the sheet P in the direction x orthogonal to the transport direction.

Modification Example (3)

FIG. 20 is a view of a printed example of a test chart in a case in which the detection of density unevenness is performed during printing.

In a case in which the detection of density unevenness is performed during printing, an image IG to be printed and a test chart TC for the detection of density are printed on one sheet P as shown in FIG. 20.

An example in which the test chart TC for the detection of density is formed of density patches having the same density is described in the example shown FIG. 20.

In this case, for example, a marginal area MA is provided at a front end portion of the sheet P in the transport direction y and the test chart TC for the detection of density is printed in the marginal area MA.

In a case in which the test chart TC for the detection of density is printed only on a part of the sheet P as described above, the grooves 114 can be arranged only on an area of the printing drum 100 corresponding to the area (marginal area MA) in which the test chart TC for the detection of density is printed. That is, the grooves 114 can be arranged only on a part of the peripheral surface of the printing drum 100.

FIG. 21 is a development view of the peripheral surface of the printing drum in a case in which grooves are arranged only on a part of the peripheral surface.

As shown in FIG. 21, grooves 114 are arranged only on an area of the printing drum corresponding to the area of the sheet in which the test chart TC for the detection of density is printed. The suction holes 112, which are arranged in a direction orthogonal to the transport direction, are connected to each other by the grooves 114. The area of the printing drum corresponding to the area of the sheet in which the test chart TC for the detection of density is printed is an area with which the area of the sheet in which the test chart TC for the detection of density is printed comes into close contact when the sheet P is held by suction. In FIG. 21, this area is shown by hatching. Since the area in which the test chart TC for the detection of density is printed is the marginal area MA of the sheet P, the grooves 114 are arranged so as to correspond to the marginal area MA of the sheet P.

Since the grooves 114 are arranged only in a necessary area as described above, it is possible to reduce an influence of the grooves 114 on the sheet P. Further, it is also possible to easily manufacture the printing drum.

Second Embodiment of Printing Drum

<Structure>

FIG. 22 is a development view showing the structure of the peripheral surface of a second embodiment of the printing drum. FIG. 23 is an enlarged view of an area ZB that is a part of FIG. 22.

In a printing drum 100 of this embodiment, an influence of the shadows of suction holes 112 on the detection of density unevenness is reduced through the optimization of the arrangement of the suction holes 112. Specifically, when the line of the suction holes 112 in the direction x orthogonal to the transport direction is referred to as a row and the line of the suction holes in the transport direction y is referred to as a column as shown in FIGS. 22 and 23, the suction holes 112 are arranged as described below. (1) The suction holes 112, which are arranged on each row, are arranged on the next columns of the suction holes 112 that are arranged on the previous row. (2) The same number of suction holes 112 are arranged on the respective columns. (3) The suction holes 112 arranged on the respective columns are arranged so that adjacent suction holes 112 are adjacent to each other in a case in which the suction holes 112 arranged on the respective columns are projected on a straight line orthogonal to the transport direction and parallel to the peripheral surface 104 that is a medium holding surface. This arrangement will be described below.

As shown in FIG. 23, the position of each suction hole 112 is represented as (M,N) by using the numbers of the row and the column. In this case, the suction hole 112 disposed on the first row and the first column is represented as (1,1) and the suction hole 112 disposed on the second row and the second column is represented as (2,2).

As described above, (1) the suction holes 112, which are arranged on each row, are arranged on the next columns of the suction holes 112 that are arranged on the previous row. For example, the suction holes (2,n) arranged on the second row are arranged on the next columns of the suction holes (1,n) that are arranged on the first row. Accordingly, in a case in which the suction hole is disposed on the first row and the first column, the suction hole is disposed on the second column on the second row. Likewise, in a case in which the suction hole is disposed on the second row and the second column, the suction hole is disposed on the third column on the third row. In this way, the suction holes 112, which are arranged on each row, are arranged on the next columns of the suction holes 112 that are arranged on the previous row.

In the case of the printing drum 100 of this embodiment, the arrangement pattern of suction holes, which includes five rows as one set, is repeatedly arranged five times. Accordingly, the arrangement pattern of the suction holes 112 arranged on the sixth row is the same as the arrangement pattern of the suction holes 112 arranged on the first row, and the arrangement pattern of the suction holes 112 arranged on the seventh row is the same as the arrangement pattern of the suction holes 112 arranged on the second row.

Further, since five rows serves as one set, the suction holes 112 are arranged on each row every five columns. Accordingly, the suction holes 112 are arranged on (M+5x) th column on each row (x=0, 1, 2, 3, ... ). For example, the suction holes 112 are arranged on the third column, the eighth column, the thirteenth column, ... on the third row.

Furthermore, the same number of suction holes 112 are arranged on the respective columns. As shown in FIG. 22, five suction holes are arranged on one column on the printing drum 100 of this embodiment when attention is focused on one medium holding surface.

In addition, the suction holes 112 arranged on the respective columns are arranged so that adjacent suction holes 112 are adjacent to each other in a case in which the suction holes 112 arranged on the respective columns are projected on a straight line orthogonal to the transport direction and parallel to the peripheral surface 104 that is the medium holding surface.

"A straight line orthogonal to the transport direction and parallel to the medium holding surface" means a straight line that is parallel to the medium holding surface among straight lines orthogonal to the transport direction y. In other words, "a straight line orthogonal to the transport direction and parallel to the medium holding surface" means a straight line that is orthogonal to the transport direction y in a plane parallel to the medium holding surface. The suction holes 112 arranged on the respective columns are arranged so as to be adjacent to each other when being projected on this straight line.

Further, "arranged so as to be adjacent" means that the suction holes 112 are arranged so that at least adjacent suction holes are arranged so as to be adjacent to each other when the suction holes 112 are projected on the straight line. Accordingly, "arranged so as to be adjacent" is a concept also including a case in which the suction holes 112 are arranged so as to overlap each other.

(A) and (B) of FIG. 24 are views illustrating an interval between suction holes in a row direction. (A) of FIG. 24 shows actual arrangement of the suction holes. (B) of FIG. 24 shows the arrangement of the suction holes when the suction holes are projected on a straight line that is orthogonal to the transport direction and parallel to the medium holding surface.

As shown in (B) of FIG. 24, the suction holes 112 arranged on the respective columns are arranged so that adjacent suction holes 112 are adjacent to each other in a case in which the suction holes 112 arranged on the respective columns are projected on a straight line Lx orthogonal to the transport direction and parallel to the medium holding surface. Particularly, in a case in which the shape of each suction hole 112 is a circular shape as in the printing drum 100 of this embodiment, the suction holes 112 arranged on the respective columns are arranged so as to partially overlap the suction holes 112 arranged on the next column. That is, the suction holes 112 arranged on the respective columns are arranged so as to partially overlap each other. In this case, the suction holes (m,2) arranged on, for example, the second column are arranged so as to partially overlap the suction holes (m,1) arranged on the first column and the suction holes (m,3) arranged on the third column. Accordingly, the suction hole (2,2) disposed on the second row and the second column is disposed so as to partially overlap the suction hole (1,1) disposed on the first row and the first column and the suction hole (3,3) disposed on the third row and the third column.

[Action]

(A) to (C) of FIG. 25 are views illustrating the action of the printing drum of the second embodiment. (A) of FIG. 25 shows a part of a read image of a density patch, which is read by the scanner, in a case in which the printing drum of this embodiment is used. (A) of FIG. 25 shows a state in which the images of the shadows of the suction holes are projected on a straight line orthogonal to the transport direction and parallel to the medium holding surface. (C) of FIG. 25 shows the detection result of density.

The printing drum 100 of this embodiment includes the suction holes 112 on the peripheral surface thereof as shown in (A) of FIG. 25. For this reason, even though the image of a density patch printed at a uniform density is read by the scanner, the shadows S of the suction holes 112 are seen in the read image. The shadows S appear in a pattern corresponding to the arrangement pattern of the suction holes 112.

As described above, in the printing drum 100 of this embodiment, (1) the suction holes 112 arranged on each row are arranged on the next columns of the suction holes 112 arranged on the previous row, (2) the same number of suction holes 112 are arranged on the respective columns, and (3) the suction holes 112 arranged on the respective columns are arranged so as to partially overlap the suction holes 112 arranged on the adjacent columns.

In a case in which the suction holes 112 are arranged as described above, the shadows S of the suction holes appear substantially uniformly over the entire area of the sheet P in the width direction of the sheet P as shown in (B) of FIG. 25. Here, the width direction of the sheet P is a direction that is orthogonal to the transport direction of the sheet P and is parallel to the medium holding surface as described above, and is the main scanning direction for the reading performed by the scanner 48.

As a result, in a case in which density is acquired as an average value of brightness in a direction parallel to the transport direction y, the detection value of density becomes a value that is substantially constant over the entire area of the sheet P in the width direction as shown in (C) of FIG. 25.

FIGS. 26A, 26B, and 26C are views illustrating the detection results of density that are obtained when a density patch not having density unevenness is read. FIG. 26A shows the image of a density patch not having density unevenness. FIG. 26B shows a read image in a case in which a density patch not having density unevenness is read by the scanner. FIG. 26C shows the detection result of density.

When a sheet on which an image I0 of a density patch not having density unevenness as shown in FIG. 26A is printed is read by the scanner, the shadows S of the suction holes 112 are seen in a read image i0 as shown in FIG. 26B.

However, when the density of each area is taken as an average value in the transport direction y, the shadows S of the suction holes 112 appear substantially uniformly in each area. Accordingly, density (brightness), which is substantially constant over the entire area of the sheet P in the width direction as a whole, is obtained as shown in FIG. 26C.

FIGS. 27A, 27B, and 27C are views illustrating the detection results of density that are obtained when a density patch having density unevenness is read. FIG. 27A shows the image of a density patch having density unevenness. FIG. 27B shows a read image in a case in which a density patch having density unevenness is read by the scanner. FIG. 27C shows the detection result of density.

When a sheet on which an image I1 of a density patch having density unevenness as shown in FIG. 27A is printed is read by the scanner, the shadows S of the suction holes 112 are seen in a read image i1 together with the density unevenness as shown in FIG. 27B.

However, when the density of each area is taken as an average value in the transport direction y, density components caused by the shadows S of the suction holes 112 are offset as a whole. As a result, only the density detection value (brightness value) of a portion at which density unevenness is actually generated is changed as shown in FIG. 27C. Accordingly, it is possible to detect the presence/absence of density unevenness and a portion at which density unevenness is generated by detecting the portion of which the density detection value is changed.

According to the printing drum 100 of this embodiment, it is possible to accurately detect density unevenness without the influence of the suction holes 112 even in a case in which a sheet P is sucked using air pressure in this way.

<Method of Determining Arrangement Condition of Suction Holes>

The suction holes 112 are arranged so that density is substantially constant over the entire area of the sheet P in the width direction when density is obtained as an average value of brightness in the transport direction as described above.

Specifically, the interval between the suction holes is set in consideration of items, which affect a shadow, such as the brightness of the illumination lamp and the resolution and sensitivity of the imaging element. For example, the suction holes 112 are arranged so as to satisfy a condition where a sheet serving as a reference, that is, a sheet that has constant translucency over the entire area of the sheet in a width direction of the sheet and constant reflectivity is transported and an integrated value of brightness in the transport direction, which is obtained from a read image in a case in which the image of the sheet is read by the scanner, is constant over the entire area of the sheet P in the width direction. That is, the diameter of each suction hole, an interval between the rows, and an interval between the columns are determined so that the integrated value of brightness in the transport direction, which is to be output, is constant over the entire area of the sheet P in the width direction. Accordingly, the arrangement of the suction holes 112 can be optimized. Here, the width direction of the sheet is a direction that is orthogonal to the transport direction of the sheet.

It is preferable that a sheet, which is actually printed by the printing apparatus, is selected as the sheet serving as a reference. In a case in which a plurality of these sheets are present, it is preferable that a sheet having the highest translucency among the sheets is selected as the sheet serving as a reference.

It is preferable that the value of density (the average value of brightness) is made constant over the entire area of the sheet P in the width direction, but the value of density has only to be constant in a range in which density unevenness can be distinguished. The reason for this is that the influence of a shadow is changed depending on the brightness of an illumination lamp to be used, the resolution and sensitivity of an imaging element to be used, or the like. Accordingly, the arrangement condition of the suction holes 112 has only to be determined so that the value of density is in a fixed allowable range. Particularly, the interval between the columns has only to be set to a condition where the value of density is constant in a fixed allowable range over the entire area in a direction orthogonal to the transport direction. The allowable range can be set to a range in which, for example, a difference ΔE between adjacent colors is smaller than 1. In this case, the interval between the suction holes is adjusted so that a difference ΔE between adjacent colors satisfies "ΔE<1".

Considering the characteristics of human sight, it is preferable that an interval where the suction holes 112 are shifted, that is, an interval between the columns is set to 0.3 mm or less.

The suction hole 112 has a circular shape, and the diameter of the suction hole 112 can be set to, for example, 0.8 mm.

MODIFICATION EXAMPLES

Modification Example (1)

In a case in which the area in which a test chart is to be printed is limited to a part of a sheet, the area in which the suction holes are arranged so as to satisfy the above-mentioned condition can also be limited to a part of the area of the peripheral surface of the printing drum. For example, in a case in which a test chart TC for the detection of density is printed in an area that is a part of the sheet P as shown in FIG. 20, the suction holes can be arranged only in the area of the printing drum, which correspond to the area of the sheet in which the test chart TC for the detection of density is printed, so as to satisfy the above-mentioned condition. In this case, the suction holes are arranged in other areas so as to satisfy other arrangement conditions. For example, the suction holes are arranged in other areas at a constant pitch in a vertical direction and a horizontal direction.

FIG. 28 is a development view of the peripheral surface of the printing drum which suction holes are arranged only on a part of an area thereof so as to satisfy a specific condition.

In the example shown in FIG. 28, the suction holes 112 are arranged only in the area of the printing drum, which corresponds to the area of the sheet in which the test chart TC for the detection of density is printed, so as to satisfy above-mentioned condition and the suction holes 112 are arranged in other areas at a constant pitch in a vertical direction and a horizontal direction.

As described above, the area of the printing drum, which corresponds to the area of the sheet in which the test chart TC for the detection of density is printed, is an area with which the area of the sheet in which the test chart TC for the detection of density is printed comes into close contact when the sheet P is held by suction. In FIG. 28, this area is shown by hatching. The area in which the test chart for the detection of density is printed is the marginal area MA of the sheet P. Accordingly, the suction holes 112 are arranged in the area of the printing drum corresponding to the marginal area MA of the sheet P so as to satisfy the above-mentioned condition. The suction holes 112 are arranged in other areas at a constant pitch in a vertical direction and a horizontal direction. That is, the suction holes 112 are arranged at regular intervals in the transport direction y and are arranged at regular intervals in a direction orthogonal to the transport direction y.

Modification Example (2)

(A) and (B) of FIG. 29 are views illustrating Modification example the suction hole. (A) of FIG. 29 shows the shape and arrangement of suction holes. (B) of FIG. 29 shows the arrangement of the suction holes when the suction holes are projected on a straight line orthogonal to the transport direction and parallel to the medium holding surface.

The shape of the suction hole 112 has been a circular shape in the above-mentioned embodiment, but the shape of the suction hole 112 is not limited thereto. As shown in (A) and (B) of FIG. 29, the shape of the suction hole 112 can also be a quadrangular shape. Even in this case, the suction holes 112 are arranged so as to satisfy the above-mentioned arrangement condition.

Other Embodiments

<Case in Which Protrusions are Arranged>

A technique, which prevents the generation of wrinkles by regularly arranging protrusions on a medium holding surface, is known (for example, see JP2013-151149A). In a case in which the protrusions are arranged on the medium holding surface, it is preferable that the protrusions are also arranged so as to satisfy the same condition as the suction holes.

FIG. 30 is a development view of the peripheral surface of a printing drum that includes protrusions on the peripheral surface thereof.

When the line of protrusions 116 in a direction x orthogonal to a transport direction of a sheet P is referred to as a row and the line of the protrusions 116 in the transport direction y is referred to as a column, the protrusions 116 are arranged as described below. That is, the protrusions 116, which are arranged on each row, are arranged on the next columns of the protrusions 116 that are arranged on the previous row. Further, the same number of protrusions 116 are arranged on the respective columns. Furthermore, the protrusions 116 arranged on the respective columns are arranged so that adjacent protrusions 116 are adjacent to each other in a case in which the protrusions 116 arranged on the respective columns are projected on a straight line orthogonal to the transport direction.

The specific interval between the protrusions 116 and the diameter of the protrusion 116 are set in consideration of an item, which affect a shadow, such as the brightness of the illumination lamp. For example, the protrusions 116 are arranged so as to satisfy a condition where a sheet serving as a reference, that is, a sheet that has constant translucency over the entire area of the sheet in a width direction of the sheet and constant reflectivity is transported and an integrated value of brightness in the transport direction, which is obtained from a read image in a case in which the image of the sheet is read by the scanner, is constant over the entire area of the sheet P in the width direction. That is, the diameter of each protrusion, an interval between the rows, and an interval between the columns are determined so that the integrated value of brightness in the transport direction, which is to be output, is constant over the entire area of the sheet P in the width direction. Here, the width direction of the sheet is a direction that is orthogonal to the transport direction of the sheet.

Accordingly, since it is possible to reduce an influence of shadows, which are formed by the protrusions 116, it is possible to accurately detect density unevenness.

The protrusion 116 can be formed in, for example, a columnar shape or a hemispherical shape. In a case in which the shape of the protrusion 116 is a columnar shape or a hemispherical shape, the diameter of the protrusion 116 can be set to, for example, 1.0 mm.

Further, each protrusion 116 can be disposed between the suction holes 112 in the transport direction y. Particularly, each protrusion 116 can be disposed at an intermediate position.

In a case in which an area in which a test chart is to be printed is limited to a part of a sheet, an area in which the protrusions are arranged so as to satisfy the above-mentioned condition can also be limited to a part of the area of the printing drum.

Further, an example in which the protrusions are arranged on the printing drum on which suction holes are arranged so as to satisfy a specific condition as in the printing drum of the second embodiment has been described in the example shown in FIG. 30, but the protrusions can also be arranged on the printing drum including grooves as in the printing drum of the first embodiment.

Another Example of a Transport Unit

FIG. 31 is a perspective view showing another example of the transport unit.

The transport unit has been formed of a rotating drum (printing drum 100) in the above-mentioned embodiments, but the transport unit can also be formed of an endless belt 300 that travels along a fixed path and goes around as shown in FIG. 31. In this case, the peripheral surface 302 of the belt 300 forms a medium holding surface. Accordingly, suction holes and grooves are formed on the peripheral surface 302 of the belt 300. Alternatively, suction holes are arranged on the peripheral surface 302 of the belt 300 so as to satisfy the condition described in the second embodiment. The example shown in FIG. 31 is an example in which grooves are arranged on the peripheral surface 302.

<Printing Apparatus>

Cases in which the invention is applied to an ink jet printing apparatus have been described in the above-mentioned embodiments by way of example, but the application of the invention is not limited thereto. The invention can be applied to general apparatuses for transporting a sheet-like medium.

Further, cases in which the scanner is installed in the printing section have been described in the above-mentioned embodiments by way of example, but a position where the scanner is installed is not limited thereto.

Furthermore, the transport unit of the image reading device has also been used as the transport unit of the printing section in the above-mentioned embodiments, but a transport unit for exclusive use may be prepared.

<Image Reading Device>

Examples in which the image reading device is built in the printing apparatus have been described in the above-mentioned embodiments, but the image reading device can also be provided alone. In this case, for example, the image reading device includes the drum or the endless belt serving as the transport unit and the scanner serving as the reading unit.

Further, a combination of the image reading device and a computer can also be formed as a density unevenness detecting device. In this case, the computer functions as a density unevenness detecting section that detects density from an image, which is read by the image reading device, by executing a predetermined program.

EXPLANATION OF REFERENCES

1: printing apparatus
10: sheet feeding section
12: sheet feeding device
14: feeder board
16: sheet feed drum
17: gripper
20: treatment liquid applying section
22: treatment liquid applying drum
23: gripper
24: treatment liquid applying device
30: treatment liquid drying section
32: treatment liquid drying drum
33: gripper
34: treatment liquid drying device
40: printing section
32: pressing roller
44: head unit
46C, 46M, 46Y, 46K: ink jet head
48: scanner
48A: imaging element
48B: optical system
48C: illumination lamp
50: ink drying section
52: chain gripper
52A: chain
52B: gripper
54: sheet guide
54A: first guide board
54B: second guide board
56: heating-drying device
56A: infrared lamp
60: collecting section
62: collecting device
100: printing drum
102: gripper
104: peripheral surface of printing drum
108: motor
110: vacuum pump
112: suction hole
114: groove
116: protrusion
200: computer
202: communication section
204: operation section
206: display section
208: storage section
210: density unevenness detecting section
300: belt
302: peripheral surface of belt
P: sheet

What is claimed is:

1. An image reading device comprising:
a transport unit for transporting a sheet-like medium while sucking the medium on a medium holding surface on which suction holes are regularly arranged; and
an image reading unit for reading an image from the medium transported by the transport unit, wherein
grooves, which cross a holding area for the medium in a direction orthogonal to a transport direction, are regularly arranged along the transport direction on the medium holding surface, and the suction holes arranged on the medium holding surface are arranged in the grooves, and
the grooves are formed so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

2. The image reading device according to claim 1,
wherein the suction holes are arranged at a first interval in a direction orthogonal to the transport direction and are arranged at a second interval in the transport direction, and
the grooves are arranged at the same interval as the interval between the suction holes in the transport direction.

3. The image reading device according to claim 2,
wherein protrusions are further arranged regularly on the medium holding surface, and
when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

4. The image reading device according to claim 1,
wherein protrusions are further arranged regularly on the medium holding surface, and
when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

5. The image reading device according to claim 1,
wherein the transport unit is a rotating drum, and a peripheral surface of the drum forms the medium holding surface.

6. The image reading device according to claim 1,
wherein the transport unit is an endless belt going around, and a peripheral surface of the belt forms the medium holding surface.

7. A printing apparatus comprising:
a printing unit; and
the image reading device according to claim 1.

8. The printing apparatus according to claim 7,
wherein the printing unit performs printing on a medium transported by the transport unit.

9. The printing apparatus according to claim 8,
wherein the printing unit prints an image by an ink jet method.

10. The printing apparatus according to claim 7, further comprising:
a density unevenness detecting section that allows the printing unit to print a test chart for a detection of density, acquires a density detection value on the basis of image data of the test chart for the detection of density read by the image reading device, and detects presence/absence of density unevenness from a presence/absence of a change in the density detection value.

11. An image reading device comprising:
a transport unit for transporting a sheet-like medium while sucking the medium on a medium holding surface on which suction holes are regularly arranged; and
an image reading unit for reading an image from the medium transported by the transport unit,
wherein when a line of the suction holes in a direction orthogonal to a transport direction is referred to as a row and a line of the suction holes in the transport direction is referred to as a column, the suction holes arranged on each row are arranged on the next columns of the suction holes arranged on the previous row, the same number of the suction holes are arranged on the respective columns, and the suction holes arranged on the respective columns are arranged so that the adjacent suction holes are adjacent to each other in a case in which the suction holes arranged on the respective columns are projected on a straight line orthogonal to the transport direction and parallel to the medium holding surface.

12. The image reading device according to claim 11,
wherein the suction holes are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

13. The image reading device according to claim 12,
wherein protrusions are further arranged regularly on the medium holding surface, and
when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

14. The image reading device according to claim 11,
wherein protrusions are further arranged regularly on the medium holding surface, and
when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

15. An image reading device comprising:
a transport unit for transporting a sheet-like medium while sucking the medium on a medium holding surface on which suction holes are regularly arranged; and
an image reading unit for reading an image from the medium transported by the transport unit, wherein
grooves, which cross a holding area for the medium in a direction orthogonal to a transport direction, are regularly arranged along the transport direction on the medium holding surface, and the suction holes arranged on the medium holding surface are arranged in the grooves,
protrusions are further arranged regularly on the medium holding surface, and
when a line of the protrusions in a direction orthogonal to the transport direction is referred to as a row and a line of the protrusions in the transport direction is referred to as a column, the protrusions arranged on each row are arranged on the next columns of the protrusions arranged on the previous row, the same number of the protrusions are arranged on the respective columns, and the protrusions arranged on the respective columns are arranged so that the adjacent protrusions are adjacent to each other in a case in which the protrusions arranged on the respective columns are projected on a straight line orthogonal to the transport direction and parallel to the medium holding surface.

16. The image reading device according to claim 15,
wherein the protrusions are arranged so as to satisfy a condition where an integrated value of brightness in the transport direction, which is to be output, is constant over the entire area of a medium in a direction orthogonal to the transport direction and parallel to the medium holding surface in a case in which the medium having constant translucency and constant reflectivity is transported by the transport unit and is read by the image reading unit.

17. The image reading device according to claim 15,
wherein the transport unit is a rotating drum, and a peripheral surface of the drum forms the medium holding surface.

* * * * *